(12) United States Patent
Fukumoto et al.

(10) Patent No.: US 11,332,686 B2
(45) Date of Patent: May 17, 2022

(54) FLUORINE-CONTAINING ETHER COMPOUND, LUBRICANT FOR MAGNETIC RECORDING MEDIUM AND MAGNETIC RECORDING MEDIUM

(71) Applicant: SHOWA DENKO K.K., Tokyo (JP)

(72) Inventors: Naoya Fukumoto, Ichihara (JP); Yuta Yamaguchi, Kawasaki (JP); Naoko Ito, Tokyo (JP); Katsumi Murofushi, Ichihara (JP)

(73) Assignee: SHOWA DENKO K.K., Tokyo (JP)

( * ) Notice: Subject to any disclaimer, the term of this patent is extended or adjusted under 35 U.S.C. 154(b) by 370 days.

(21) Appl. No.: 16/470,713

(22) PCT Filed: Nov. 24, 2017

(86) PCT No.: PCT/JP2017/042189
§ 371 (c)(1),
(2) Date: Jun. 18, 2019

(87) PCT Pub. No.: WO2018/116742
PCT Pub. Date: Jun. 28, 2018

(65) Prior Publication Data
US 2021/0340457 A1  Nov. 4, 2021

(30) Foreign Application Priority Data
Dec. 20, 2016  (JP) .............................. JP2016-247157

(51) Int. Cl.
*C10M 107/38* (2006.01)
*C08G 65/331* (2006.01)
(Continued)

(52) U.S. Cl.
CPC .......... *C10M 107/38* (2013.01); *C08G 65/331* (2013.01); *G11B 5/725* (2013.01); *C10M 2213/0606* (2013.01); *C10N 2040/18* (2013.01)

(58) Field of Classification Search
CPC ........ C10M 107/38; C10M 2213/0606; C10N 2040/18; C08G 65/331; G11B 5/725
See application file for complete search history.

(56) References Cited

U.S. PATENT DOCUMENTS

| 8,518,564 B2* | 8/2013 | Burns .................... G11B 5/725 428/835.8 |
| 2015/0235664 A1* | 8/2015 | Deng .................. G11B 5/8408 360/75 |
| 2017/0260472 A1 | 9/2017 | Sagata et al. |

FOREIGN PATENT DOCUMENTS

| JP | 2010-248463 A | 11/2010 |
| JP | 4632144 B2 | 2/2011 |

(Continued)

OTHER PUBLICATIONS

Guo, X.-C., Marchon, B, Wang, R.-H., Mate, C.M., Dai, Q., Waltman, R.J., Deng, H., Pocker, D., Xiao, Q.-F., Saito, Y., Ohtani, T. "A multidentate lubricant for hard disk drives at sub-nanometer thickness", J. Appl. Phys., 111, 024503, 2012 (Year: 2012).*

(Continued)

*Primary Examiner* — James C Goloboy
(74) *Attorney, Agent, or Firm* — Sughrue Mion, PLLC

(57) ABSTRACT

A fluorine-containing ether compound represented by formula (1) shown below.

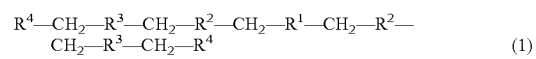

(In formula (1), $R^1$ and $R^3$ represent different perfluoropolyether chains, $R^2$ represents a linking group containing one or more polar groups, and $R^4$ represents a terminal group containing two or more polar groups.)

15 Claims, 1 Drawing Sheet

(51) Int. Cl.
*G11B 5/725* (2006.01)
*C10N 40/18* (2006.01)

(56) References Cited

FOREIGN PATENT DOCUMENTS

| | | |
|---|---|---|
| JP | 2012-7008 A | 1/2012 |
| JP | 2012-184339 A | 9/2012 |
| WO | 2013/054393 A1 | 4/2013 |
| WO | 2015/022871 A1 | 2/2015 |
| WO | 2016/084781 A1 | 6/2016 |
| WO | 2017/145995 A1 | 8/2017 |

OTHER PUBLICATIONS

X.-C. Guo, et al., "A multidentate lubricant for use in hard disk drives at subnanometer thickness", Journal of Applied Physics, 2012, 024503-1 to 024503-7, vol. 111.
International Search Report for PCT/JP2017/042189 dated Feb. 27, 2018 [PCT/ISA/210].

* cited by examiner

FLUORINE-CONTAINING ETHER COMPOUND, LUBRICANT FOR MAGNETIC RECORDING MEDIUM AND MAGNETIC RECORDING MEDIUM

CROSS-REFERENCE TO RELATED APPLICATIONS

This application is a National Stage of International Application No. PCT/JP2017/042189, filed on Nov. 24, 2017, which claims priority from Japanese Patent Application No. 2016-247157, filed Dec. 20, 2016, the contents of which are incorporated herein by reference.

TECHNICAL FIELD

The present invention relates to a fluorine-containing ether compound, a lubricant for a magnetic recording medium, and a magnetic recording medium.

BACKGROUND ART

In order to improve the recording density of magnetic recording and playback devices, the development of magnetic recording media that are suited to high recording densities continues to progress.

Conventional magnetic recording media include magnetic recording media obtained by forming a recording layer on a substrate, and then forming a protective layer of carbon or the like on the recording layer. The protective layer protects the information recorded on the recording layer, and also enhances the slidability of the magnetic head. However, satisfactory durability for the recording medium cannot be achieved simply by providing a protective layer on the recording layer. Therefore, a lubricant layer is generally formed by applying a lubricant to the surface of the protective layer.

Examples of lubricants that have been proposed for the lubricant which is used when forming the lubricant layer for the magnetic recording medium include lubricants containing a compound which is a fluorine-based polymer having a repeating structure containing $CF_2$ and having polar groups such as hydroxyl groups at the polymer terminals (for example, see Patent Documents 1 to 6).

PRIOR ART LITERATURE

Patent Documents

Patent Document 1: U.S. Unexamined Patent Application Publication No. 2015/0235664
Patent Document 2: Japanese Unexamined Patent Application, First Publication No. 2012-184339
Patent Document 3: Japanese Unexamined Patent Application, First Publication No. 2010-248463
Patent Document 4: Japanese Unexamined Patent Application, First Publication No. 2012-7008
Patent Document 5: Japanese Patent No. 4632144
Patent Document 6: International Patent Publication No. 2013/054393

DISCLOSURE OF INVENTION

Problems to be Solved by the Invention

In magnetic recording and playback devices, further reductions in the floating height of the magnetic head would be desirable. Accordingly, reducing the thickness of the lubricant layer in the magnetic recording medium is desirable.

However, if the thickness of the lubricant layer is reduced, then the adhesion between the protective layer and the lubricant layer coating the surface of the protective layer may sometimes be insufficient, resulting in the occurrence of pickup in which the fluorine-containing ether compound in the lubricant layer adheres to the magnetic head.

Further, in order to improve the durability of the magnetic recording medium, it is necessary that the lubricant layer exhibits superior adhesion to the protective layer.

The present invention has been developed in light of the above circumstances, and has an object of providing a fluorine-containing ether compound that can be used favorably as a material for a magnetic recording medium lubricant that is capable of forming a lubricant layer which exhibits favorable adhesion to the protective layer and can suppress the occurrence of pickup.

Further, the present invention also has an object of providing a magnetic recording medium lubricant containing the fluorine-containing ether compound of the present invention.

Furthermore, the present invention also has an object of providing a magnetic recording medium having a lubricant layer formed using the fluorine-containing ether compound of the present invention.

Means for Solving the Problems

The inventors of the present invention conducted intensive research aimed at achieving the above objects.

As a result, they discovered that the objects could be achieved by using a fluorine-containing ether compound containing a first perfluoropolyether (hereafter sometimes abbreviated as "PFPE") chain disposed in the center, a second PFPE chain disposed at each of the two terminals of the first PFPE chain with a linking group containing one or more polar groups disposed therebetween, and a terminal group containing two or more polar groups disposed at the outside (the opposite side from the first PFPE chain) of each of the second PFPE chains, and they were therefore able to complete the present invention.

In other words, the present invention relates to the following items.

[1] A fluorine-containing ether compound according to a first aspect of the present invention is a fluorine-containing ether compound represented by formula (1) shown below.

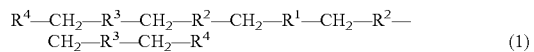
(1)

(In formula (1), $R^1$ and $R^3$ represent different perfluoropolyether chains, $R^2$ represents a linking group containing one or more polar groups, and $R^4$ represents a terminal group containing two or more polar groups.)

The fluorine-containing ether compound of the first aspect of the present invention preferably includes the features of [2] to [14] described below. These features are preferably combined as necessary.

[2] In the fluorine-containing ether compound according to [1] above, the polar group may be a hydroxyl group.
[3] In the fluorine-containing ether compound according to [1] or [2] above, $R^4$ in formula (1) may be a terminal group represented by any one of formulas (2-1) to (2-5) shown below.

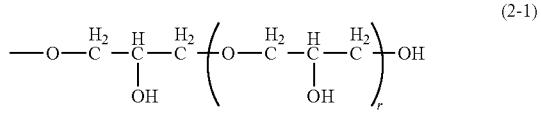 (2-1)

(In formula (2-1), r represents an integer of 0 to 4.)

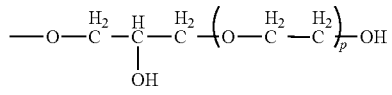 (2-2)

(In formula (2-2), p represents an integer of 1 to 5.)

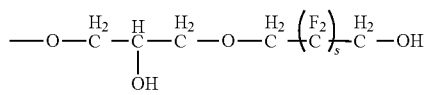 (2-3)

(In formula (2-3), s represents an integer of 2 to 5.)

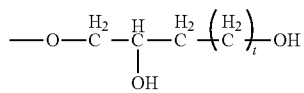 (2-4)

(In formula (2-4), t represents an integer of 1 to 5.)

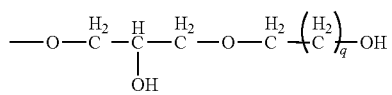 (2-5)

(In formula (2-5), q represents an integer of 2 to 5.)

[4] In the fluorine-containing ether compound according to any one of [1] to [3] above, the number of carbon atoms in $R^2$ in formula (1) may be from 1 to 20.

[5] The fluorine-containing ether compound according to any one of [1] to [4] above, wherein $R^2$ in formula (1) is represented by formula (6) shown below.

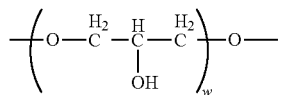 (6)

(In formula (6), w represents an integer of 1 to 4.)

[6] In the fluorine-containing ether compound according to any one of [1] to [5] above, $R^3$ in formula (1) may be a group represented by one of formulas (3-1), (3-2), (4) and (5) shown below.

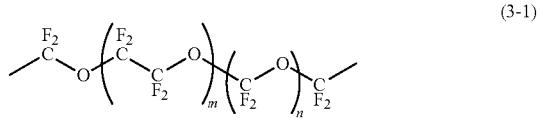 (3-1)

(In formula (3-1), m represents an integer of 1 to 20, and n represents an integer of 1 to 10.)

$$—CF_2—O—(CF_2CF_2O)_g—CF_2—$$ (3-2)

(In formula (3-2), g represents an integer of 1 to 20.)

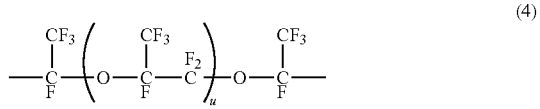 (4)

(In formula (4), u represents an integer of 1 to 30.)

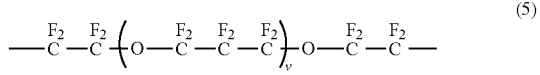 (5)

(In formula (5), v represents an integer of 1 to 30.)

[7] In the fluorine-containing ether compound according to any one of [1] to [6] above, $R^1$ in formula (1) may be represented by formula (RF-2) shown below or formula (RF-3) shown below.

$$—CF_2—O—(CF_2CF_2O)_d—CF_2—$$ (RF-2)

(In formula (RF-2), d represents an integer of 1 to 12.)

$$—CF_2—O—(CF_2CF_2O)_e—(CF_2O)_f—CF_2—$$ (RF-3)

(In formula (RF-3), e represents an integer of 1 to 20, and f represents an integer of 1 to 10.)

[8] In the fluorine-containing ether compound according to any one of [1] to [7] above, the compound represented by formula (1) may be represented by formula (C) shown below, and Rf in formula (C) shown below may be represented by formula (RF) shown below.

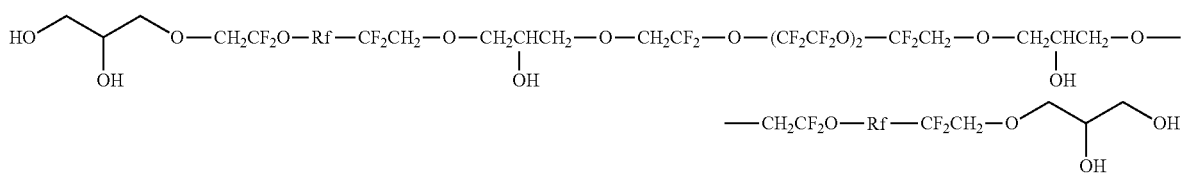 (C)

-continued

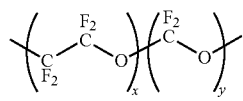
(RF)

(In formula (RF), x represents an integer of 1 to 7, and y represents an integer of 1 to 7.)

[9] In the fluorine-containing ether compound according to any one of [1] to [7] above, the compound represented by formula (1) may be represented by formula (E) shown below, and Rf in formula (E) shown below may be represented by formula (RF) shown below.

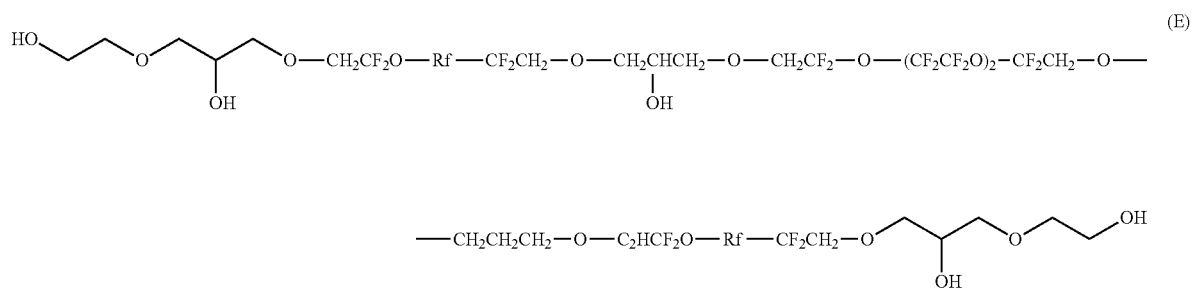
(E)

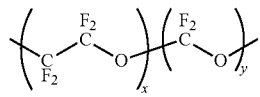
(RF)

(In formula (RF), x represents an integer of 1 to 7, and y represents an integer of 1 to 7.)

[10] In the fluorine-containing ether compound according to any one of [1] to [7] above, the compound represented by formula (1) may be represented by formula (F) shown below, and Rf in formula (F) shown below may be represented by formula (RF) shown below.

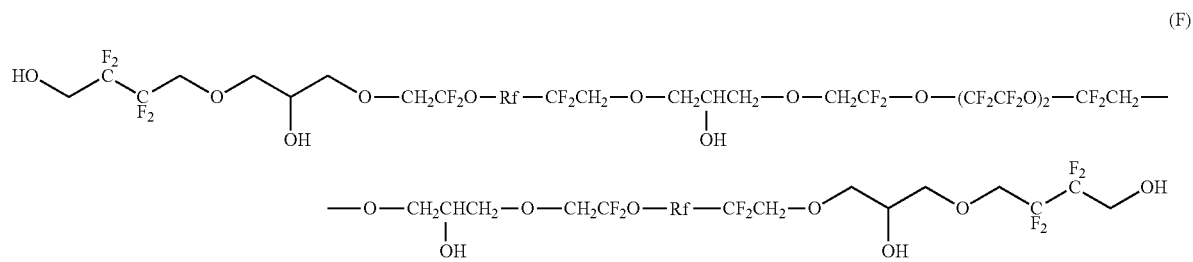
(F)

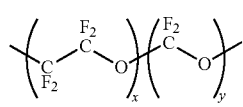
(RF)

(In formula (RF), x represents an integer of 1 to 7, and y represents an integer of 1 to 7.)

[11] In the fluorine-containing ether compound according to any one of [1] to [7] above, the compound represented by formula (1) may be represented by formula (H) shown below, and Rf in formula (H) shown below may be represented by formula (RF) shown below.

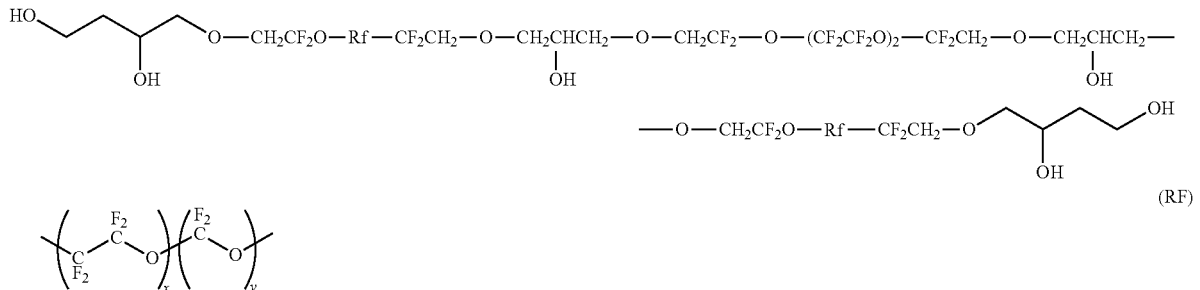

(In formula (RR) x represents an integer of 1 to 7, and y represents an integer of 11 to 7.)

[12] In the fluorine-containing ether compound according to any one of [1] to [7] above, the compound represented by formula (1) may be represented by formula (1) shown below, and Rf in formula (I) shown below may be represented by formula (RF) shown below.

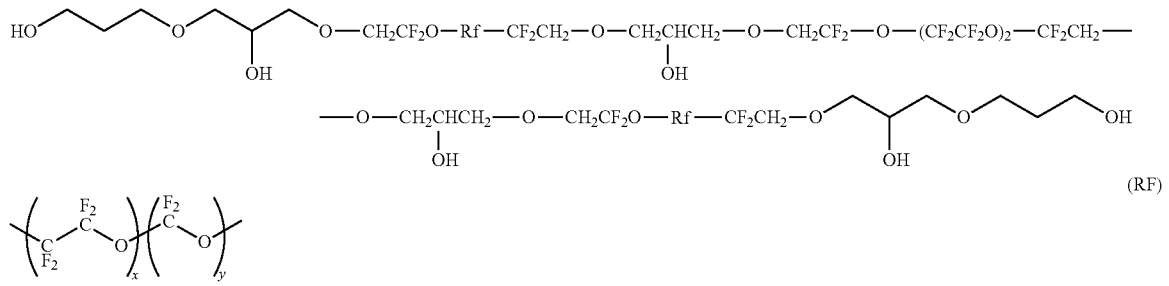

(In formula (RF), x represents an integer of 1 to 7, and y represents an integer of 1 to 7.)

[13] In the fluorine-containing ether compound according to any one of [1] to [7] above, the compound represented by formula (1) may be represented by formula (K) shown below, and in formula (K) shown below, Rf may be represented by formula (RF) shown below, and Rf₁ may be represented by formula (RF-1) shown below.

(In formula (RF), x represents an integer of 1 to 7, and y represents an integer of 1 to 7.)
(In formula (RF-1), z represents an integer of 1 to 10.)
[14] In the fluorine-containing ether compound according to any one of [1] to [13] above, the number average molecular weight may be within a range from 1,000 to 10,000.

A second aspect of the present invention relates to a lubricant for a magnetic recording medium described below.
[15] A lubricant for a magnetic recording medium containing the fluorine-containing ether compound according to any one of [1] to [14] above.

A third aspect of the present invention relates to a magnetic recording medium described below.
[16] A magnetic recording medium containing at least a magnetic layer, a protective layer and a lubricant layer provided sequentially on a substrate, wherein the lubricant layer contains the fluorine-containing ether compound according to any one of [1] to [14] above.

The third aspect of the present invention relates to a magnetic recording medium described below. The magnetic recording medium preferably includes a feature [17] described below.
[17] The magnetic recording medium according to [16] above, wherein an average thickness of the lubricant layer is from 0.5 nm to 3 nm.

Effects of the Invention

The fluorine-containing ether compound of the present invention is a compound represented by the above formula (1), and is ideal as a material for a lubricant for a magnetic recording medium.

Because the lubricant for a magnetic recording medium according to the present invention contains the fluorine-containing ether compound of the present invention, a lubricant layer can be formed that exhibits favorable adhesion to the protective layer, and can suppress pickup.

The magnetic recording medium of the present invention has a lubricant layer that exhibits favorable adhesion to the protective layer and can suppress pickup, and the magnetic recording medium therefore exhibits excellent durability.

EMBODIMENTS FOR CARRYING OUT THE INVENTION

Figure 1:
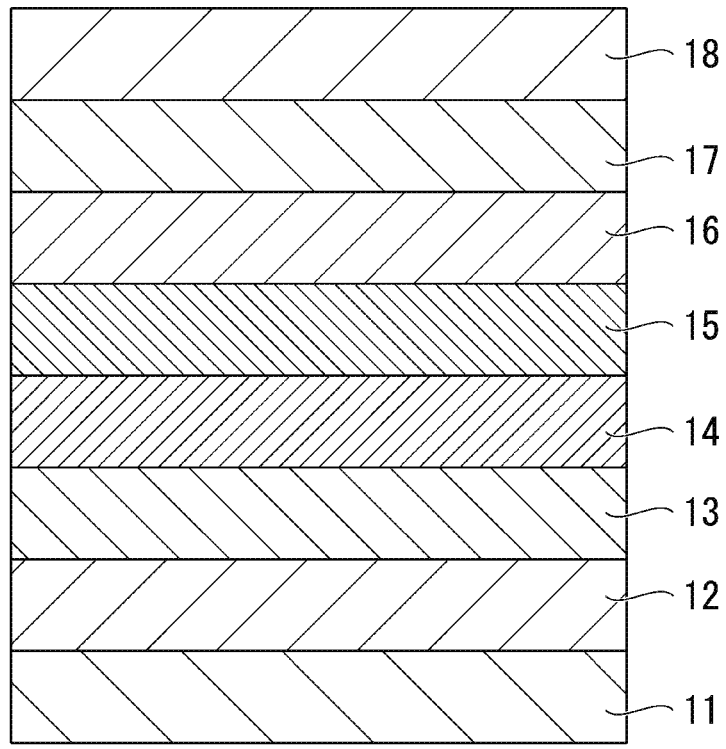
FIG. 1 is a schematic cross-sectional view illustrating one embodiment of a magnetic recording medium of the present invention.

Preferred examples of the fluorine-containing ether compound, the lubricant for a magnetic recording medium, and the magnetic recording medium according to the present invention are described below in detail. However, the present invention is not limited solely to the embodiments described below. Modifications, omissions, additions and the like can be made without departing from the scope of the present invention.

[Fluorine-Containing Ether Compound]

The fluorine-containing ether compound of an embodiment of the present invention is represented by formula (1) shown below.

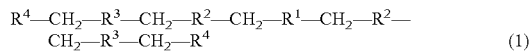

(1)

(in formula (1), $R^1$ and $R^3$ represent different perfluoropolyether chains, $R^2$ represents a linking group containing one or more polar groups, and $R^4$ represents a terminal group containing two or more polar groups.)

In those cases where a lubricant for a magnetic recording medium (hereafter also abbreviated as simply "the lubricant") containing the fluorine-containing ether compound of the present embodiment is used to form a lubricant layer on the protective layer of a magnetic recording medium, the reasons why the surface of the protective layer can be coated with a high coverage rate, even if the thickness is reduced, are described below. Moreover, the reasons why the lubricant layer exhibits excellent adhesion to the protective layer are described below.

As shown in formula (1), the fluorine-containing ether compound of the present embodiment has a first perfluoropolyether chain (hereafter, the term "perfluoropolyether chain" is sometimes abbreviated as "PFPE chain") represented by $R^1$. Further, the fluorine-containing ether compound has a second PFPE chain represented by $R^3$ disposed at each of the two terminals of the first PFPE chain with a linking group containing one or more polar groups and represented by $R^2$ disposed therebetween. Moreover, a terminal group containing two or more polar groups and represented by $R^4$ is disposed at the outside (the opposite side from the first PFPE chain) of each of the second PFPE chains represented by $R^3$.

The first PFPE chain ($R^1$) and the second PFPE chains ($R^3$) enable to coat a lubricant layer containing the fluorine-containing ether compound onto the surface of the protective layer at a high coverage rate, and reduce frictional force between the magnetic head and the protective layer.

Further, the linking groups represented by $R^2$ in formula (1) contain one or more polar groups. The terminal groups represented by $R^4$ contain two or more polar groups. In the lubricant layer containing the fluorine-containing ether compound of the present embodiment, the polar groups in the linking groups ($R^2$) and the terminal groups ($R^4$) bind the fluorine-containing ether compound and the protective layer together.

Specifically, when a lubricant layer is formed on the protective layer using the lubricant containing the fluorine-containing ether compound of the present embodiment, the first PFPE chain ($R^1$) in the fluorine-containing ether compound is adhered tightly to the protective layer as a result of the bonding between the protective layer and the linking groups ($R^2$) disposed at the two ends of the first PFPE chain. Further, the two second PFPE chains ($R^3$) are adhered tightly to the protective layer as a result of the bonding between the protective layer and the linking groups ($R^2$) linked to the first PFPE chain ($R^1$), and the bonding between the protective layer and the polar groups in the terminal groups ($R^4$) linked to the outside (the opposite side from the first PFPE chain ($R^1$)). Moreover, in the fluorine-containing ether compound of the present embodiment, the terminal groups ($R^4$) in formula (1) each contain two or more polar groups. As a result, the lubricant layer containing the fluorine-containing ether compound of the present embodiment exhibits excellent adhesion to the protective layer, and is bound strongly to the protective layer.

In the lubricant layer described above, as a result of the bonding between the polar groups and the protective layer, the two terminals of the first PFPE chain ($R^1$) in the fluorine-containing ether compound, and the two terminals of each of the second PFPE chains ($R^3$) are adhered tightly to the protective layer. Further, because the first PFPE chain ($R^1$) differs from the second PFPE chains ($R^1$), the fluorine-containing ether compound is less likely to aggregate on the protective layer compared with cases where the first PFPE chain ($R^1$) and the second PFPE chains ($R^3$) are the same. As a result of these factors, the fluorine-containing ether compound in the lubricant layer readily spreads across the protective layer within the in-plane direction and is likely to be arranged in an elongated state.

As a result, when using the lubricant containing the above fluorine-containing ether compound, the protective layer can be coated with a high coverage rate even if the thickness is reduced. Furthermore, it is thought that a lubricant layer can be formed that exhibits excellent adhesion to the protective layer and is resistant to pickup.

$R^4$ in formula (1) is a terminal group containing two or more polar groups. A terminal group containing two or more polar groups contributes to the adhesion between the protective layer to which the lubricant containing the fluorine-containing ether compound of the present embodiment is applied, and the lubricant layer that is formed by applying the lubricant. $R^4$ in formula (1) may be selected appropriately in accordance with the performance and the like required of the lubricant containing the fluorine-containing ether compound.

The two or more polar groups contained in the terminal group ($R^4$) may be all mutually different, or may include two or more of the same group. The two or more polar groups contained in the terminal group ($R^4$) may be any group that has polarity, and examples include a hydroxyl group, carboxyl group, amino group and aminocarboxyl group. Among these polar groups, hydroxyl groups are particularly preferred, as they yield a fluorine-containing ether compound that can form a lubricant layer having favorable adhesion to the protective layer. Of the two or more polar groups contained in the terminal group ($R^4$), if at least one polar group is a hydroxyl group, then in those cases where the protective layer to which the lubricant is applied is formed from either carbon or carbon which contains nitrogen, the adhesion between the protective layer and the lubricant containing the fluorine-containing ether compound can be further improved.

$R^4$ in formula (1) is preferably a terminal group represented by one of formulas (2-1) to (2-5) shown below. These types of $R^4$ groups contribute to the adhesion between the protective layer to which the lubricant containing the fluorine-containing ether compound of the present embodiment is applied, and the lubricant layer formed by applying the lubricant.

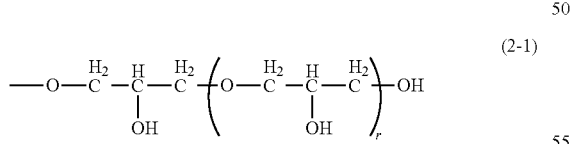

(In formula (2-1), r represents an integer of 0 to 4.)

A terminal group represented by formula (2-1) contains two or more hydroxyl groups, and therefore compared with a hydroxyl group, for example, exhibits superior adhesion to the protective layer. In formula (2-1), r is preferably an integer of 0 to 4. Because the number of hydroxyl groups in the fluorine-containing ether compound of the present embodiment is appropriate, the adhesion with the protective layer is excellent. Moreover, a lubricant layer that is resistant to pickup can be formed. Furthermore, r is more preferably an integer of 0 to 2, and is most preferably 0.

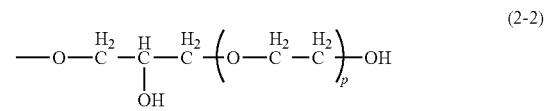

(In formula (2-2), p represents an integer of 1 to 5.)

In formula (2-2), p is preferably an integer of 1 to 5. Because the distance between the $R^3$-side hydroxyl group and the terminal hydroxyl group is appropriate, the adhesion with the protective layer is excellent. Moreover, a lubricant layer that is resistant to pickup can be formed. Furthermore, p is more preferably 1 or 2, and is most preferably 1.

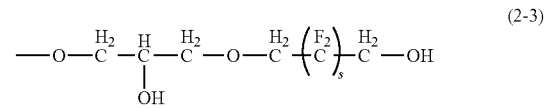

(In formula (2-3), s represents an integer of 2 to 5.)

In formula (2-3), s is preferably an integer of 2 to 5. Because the distance between the $R^3$-side hydroxyl group and the terminal hydroxyl group is appropriate, a lubricant layer can be formed that exhibits excellent adhesion to the protective layer and is resistant to pickup. Moreover, s is more preferably 2 or 3, and is most preferably 2.

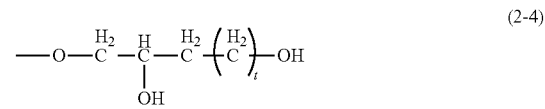

(In formula (2-4), t represents an integer of 1 to 5.)

In formula (2-4), when t is an integer of 1 to 5, the distance between the $R^3$-side hydroxyl group and the terminal hydroxyl group is appropriate, and a lubricant layer can be formed that exhibits excellent adhesion to the protective layer and is resistant to pickup. Moreover, t is more preferably 1 or 2, and is most preferably 1.

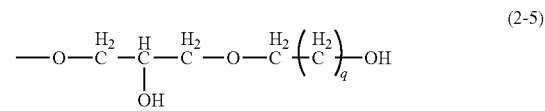

(In formula (2-5), q represents an integer of 2 to 5.)

In formula (2-5), q is preferably an integer of 2 to 5. The distance between the $R^3$-side hydroxyl group and the terminal hydroxyl group is appropriate, and a lubricant layer can be formed that exhibits excellent adhesion to the protective layer and is resistant to pickup. Moreover, q is more preferably 2 or 3.

In formula (1), $R^1$ (the first PFPE chain) is a perfluoropolyether chain. When the lubricant containing the fluorine-containing ether compound is applied to the protective layer to form a lubricant layer, the first PFPE chain enables the lubricant layer to coat the surface of the protective layer with a high coverage rate. Moreover, the first PFPE chain also imparts the lubricant layer with lubricity that reduces frictional force between the magnetic head and the protective layer.

$R^1$ is not particularly limited, and may be selected appropriately in accordance with the performance and the like required of the lubricant containing the fluorine-containing ether compound.

In formula (1), $R^1$ is preferably a PFPE chain represented by formula (RF-2) shown below, as this facilitates synthesis of the fluorine-containing ether compound.

(RF-2)

(In formula (RF-2), d represents an integer of 1 to 12.)

In those cases where $R^1$ is a PFPE chain represented by formula (RF-2), d in formula (RF-2) is preferably an integer of 1 to 12. Provided d is not more than 12, the first PFPE chain is prevented from becoming too long. As a result, when the lubricant layer is formed by applying the lubricant containing the fluorine-containing ether compound to the protective layer, the fluorine-containing ether compound is even less likely to aggregate on the protective layer. Further, an even thinner lubricant layer can be formed with a satisfactory coverage rate. Moreover, d is more preferably an integer of 1 to 10.

Further, d in formula (RF-2) is preferably an integer of 1 to 7, more preferably an integer of 1 to 3, even more preferably either 1 or 2, and most preferably 2. Provided d in formula (RF-2) is at least 1, the first PFPE chain exhibits satisfactory length. As a result, when the lubricant layer is formed on the protective layer using the lubricant containing the fluorine-containing ether compound, the lubricant layer is able to adsorb to the surface of the protective layer with superior adhesion. Moreover, favorable lubricity can be imparted to the lubricant layer.

In formula (1), $R^1$ may also be a PFPE chain represented by formula (RF-3) shown below.

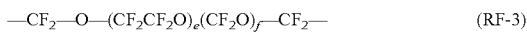

(RF-3)

(in formula (RF-3), e represents an integer of 1 to 20, and f represents an integer of 1 to 10.)

In formula (RF-3), e represents an integer of 1 to 20, and f represents an integer of 1 to 10. The shorter the first PFPE chain is within the fluorine-containing ether compound applied to the protective layer, the thinner the lubricant layer is that can be formed on the protective layer. Accordingly, it is more preferable that e is an integer of 1 to 7 and n is an integer of 1 to 7.

The value of e may be selected appropriately from within the above range in accordance with the desired properties, and may be within a range from 1 to 10, a range from 1 to 5, a range from 1 to 3, or a range from 1 to 2. Similarly, f may be selected appropriately from within the above range in accordance with the desired properties, and may be within a range from 1 to 7, a range from 1 to 5, a range from 1 to 3, or a range from 1 to 2.

In formula (1), $R^3$ (the second PFPE chain) is a perfluoropolyether chain that differs from $R^1$ (the first PFPE chain). In a similar manner to the first PFPE chain, when a lubricant layer is formed by applying the lubricant containing the fluorine-containing ether compound to the protective layer, the second PFPE chain coats the surface of the protective layer, and also contributes to the lubricity of the lubricant layer, thereby reducing frictional force between the magnetic head and the protective layer.

In the fluorine-containing ether compound of the present embodiment, PFPE chains that can be used as $R^1$ (the first PFPE chain) may be used as $R^3$ (the second PFPE chain). However, $R^1$ and $R^3$ in formula (1) are different PFPE chains. As a result, when the lubricant containing the fluorine-containing ether compound of the present embodiment is applied to the protective layer, the fluorine-containing ether compound tends not to aggregate, but rather spreads readily across the protective layer within the in-plane direction and is likely to be arranged in an elongated state. As a result, it is thought that a lubricant containing the fluorine-containing ether compound described above is able to form a lubricant layer that is resistant to pickup.

In the present embodiment, the fact that $R^1$ (the first PFPE chain) and $R^3$ (the second PFPE chain) in formula (1) are different means that the repeating units of the PFPE chains differ. Accordingly, if the repeating units of the PFPE chains of $R^1$ and $R^3$ in formula (1) are the same, then even if the numbers of those repeating units differ between $R^1$ and $R^3$, $R^1$ and $R^3$ are deemed to be the same. For example, if $R^1$ and $R^3$ are both PFPE chains represented by formula (3-1), then even if the values of m and n in formula (3-1) differ between $R^1$ and $R^3$, $R^1$ and $R^3$ are deemed to be the same.

$R^3$ in formula (1) is preferably represented by one of formulas (3-1), (3-2), (4) and (5) shown below.

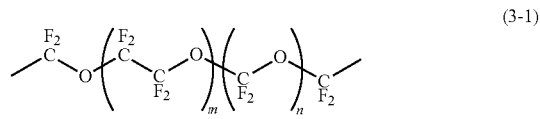

(3-1)

(In formula (3-1), m represents an integer of 1 to 20, and n represents an integer of 1 to 10.)

In formula (3-1), m represents an integer of 1 to 20, and n represents an integer of 1 to 10. The shorter the second PFPE chains are within the fluorine-containing ether compound applied to the protective layer, the thinner the lubricant layer is that can be formed on the protective layer. Accordingly, it is preferable that m is an integer of 1 to 10 and n is an integer of 1 to 10. It is more preferable that m is an integer of 1 to 7, and n is an integer of 1 to 7. Further, m and n may each be selected appropriately in accordance with the desired properties, and may be within a range from 1 to 5, from 1 to 3, or from 1 to 2 or the like.

(3-2)

(In formula (3-2), g represents an integer of 1 to 20.)

In formula (3-2), g represents an integer of 1 to 20. The shorter the second PFPE chains are within the fluorine-containing ether compound applied to the protective layer, the thinner the lubricant layer is that can be formed on the protective layer. Accordingly, g is preferably an integer of 1 to 10. It is more preferable that g is an integer of 1 to 9. Further, the value of g may be selected appropriately in accordance with the desired properties, and may be within a range from 1 to 5, from 1 to 3, or from 1 to 2 or the like.

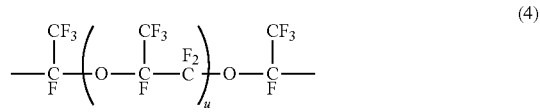

(4)

(In formula (4), u represents an integer of 1 to 30.)

In formula (4), when u is an integer within a range from 1 to 30, the number average molecular weight of the fluorine-containing ether compound of the present embodiment is more likely to fall within a preferred range. Further, u is preferably an integer of 3 to 20, and more preferably an integer of 4 to 10. The value of u may be selected appropriately in accordance with the desired properties, and may be within a range from 3 to 15, from 4 to 8, or from 4 to 6 or the like.

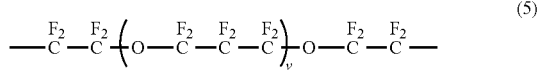

(In formula (5), v represents an integer of 1 to 30.)

In formula (5), when v is an integer within a range from 1 to 30, the number average molecular weight of the fluorine-containing ether compound of the present embodiment is more likely to fall within a preferred range. Further, v is preferably an integer of 3 to 20, and more preferably an integer of 4 to 10. The value of v may be selected appropriately in accordance with the desired properties, and may be within a range from 3 to 15, from 4 to 8, or from 4 to 6 or the like.

In those cases where $R^3$ in formula (1) is represented by one of formulas (3-1), (3-2), (4) and (5), synthesis of the fluorine-containing ether compound is easier, which is desirable. Further, when $R^3$ in formula (1) is represented by one of formulas (3-1), (3-2), (4) and (5), the ratio of the number of oxygen atoms (the number of ether linkages (—O—)) relative to the number of carbon atoms in the perfluoropolyether chain is appropriate. Consequently, a fluorine-containing ether compound having an appropriate level of hardness is obtained. As a result, the fluorine-containing ether compound applied to the protective layer is unlikely to undergo aggregation on the protective layer. Further, an even thinner lubricant layer can be formed with satisfactory adhesion. Furthermore, $R^3$ in formula (1) is more preferably represented by formula (3-1) or formula (3-2). This increases the number of ether linkages per unit of molecular weight, which enables appropriate flexibility to be achieved.

$R^2$ in formula (1) is a linking group containing one or more polar groups. This linking group contributes to the adhesion between the protective layer to which the lubricant containing the fluorine-containing ether compound of the present embodiment is applied, and the lubricant layer formed by applying the lubricant.

The linking group containing one or more polar groups is not particularly limited, and may be selected appropriately in accordance with the performance and the like required of the lubricant containing the fluorine-containing ether compound. Examples of the polar group incorporated in the linking group include a hydroxyl group, carboxyl group, amino group and aminocarboxyl group.

The linking group preferably contains at least one hydroxyl group. If the linking group contains at least one hydroxyl group, then in those cases where the protective layer to which the lubricant is applied is formed from either carbon or carbon which contains nitrogen, the adhesion between the protective layer and the lubricant containing the fluorine-containing ether compound can be improved even further.

There are no particular limitations on the number of polar groups in the linking group, and there may be one polar group or a plurality of polar groups. In order to prevent the number average molecular weight of the fluorine-containing ether compound from becoming too large, the number of polar groups in the linking group is preferably 4 or fewer.

In formula (1), the linking group represented by $R^2$ is preferably a group of 1 to 20 carbon atoms. Provided the number of carbon atoms in the linking group is not more than 20, the number average molecular weight of the fluorine-containing ether compound can be prevented from becoming too large. The number of carbon atoms in the linking group is more preferably from 3 to 12. The number of carbon atoms may be selected appropriately in accordance with the desired properties, and values within a range from 3 to 10, from 3 to 8, or from 3 to 6, are also preferred.

$R^2$ in formula (1) is preferably a group represented by formula (6) shown below, as this facilitates synthesis of the fluorine-containing ether compound.

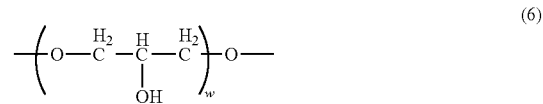

(In formula (6), w represents an integer of 1 to 4.)

In formula (6), provided w is an integer of 1 or greater, the linking group contains at least one hydroxyl group, making the adhesion with the protective layer to which the lubricant is applied more favorable. Further, when w is an integer of not more than 4, the number average molecular weight of the fluorine-containing ether compound can be prevented from becoming too large.

Further, w is preferably 1 or 2, and is more preferably 1.

Specifically, the fluorine-containing ether compound of the present embodiment is preferably a compound represented by one of formulas (C), (E), (F), (H), (I) and (K) shown below. Rf in the formulas (C), (E), (F), (H), (I) and (K) is represented by formula (RF) shown below. $Rf_1$ in formula (K) is represented by formula (RF-1) shown below.

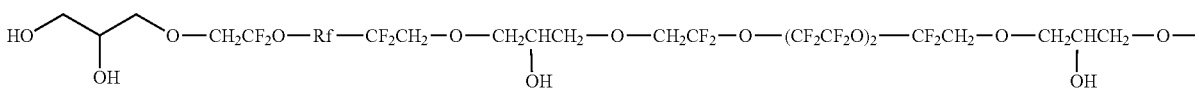

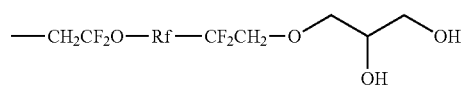

-continued

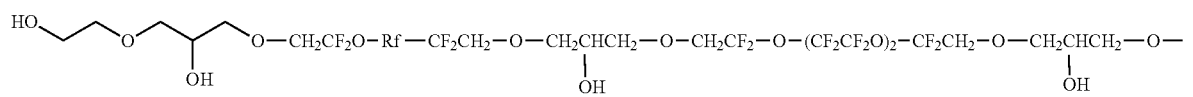
(E)

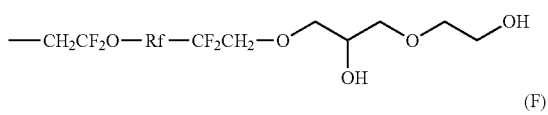

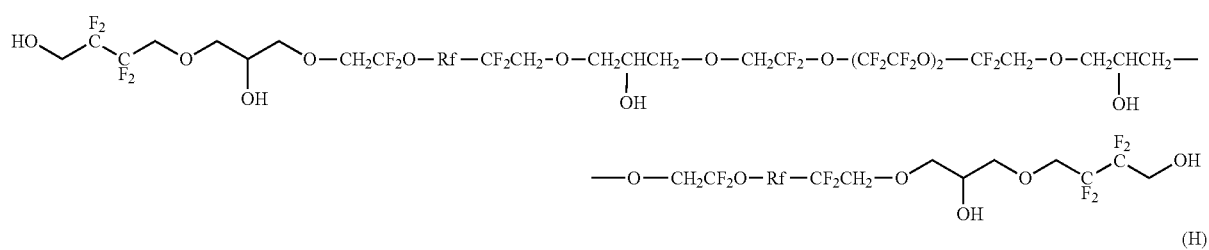
(F)

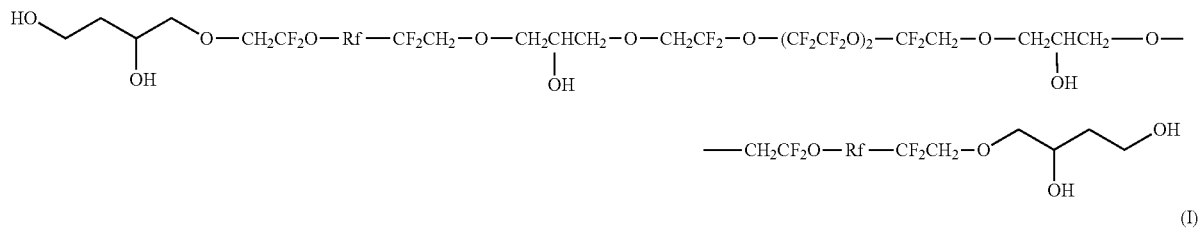
(H)

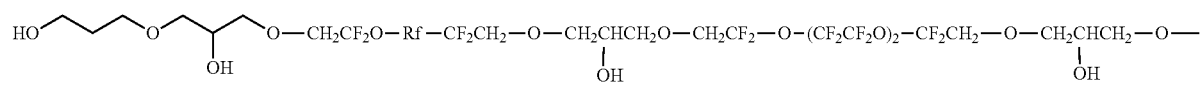

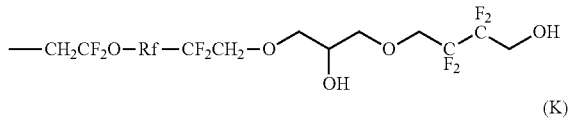
(I)

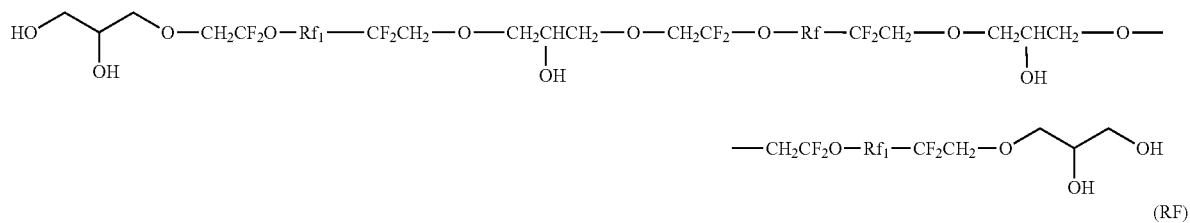
(K)

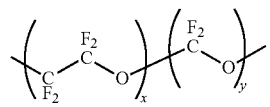
(RF)

(In formula (RF), x represents an integer of 1 to 7, and y represents an integer of 1 to 7.)

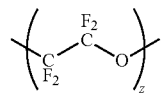
(RF-1)

(In formula (RF-1), z represents an integer of 1 to 10.)

The values for x, y and z above may each be selected appropriately in accordance with the desired properties. For example, each of x, y and z may be an integer of 1 to 6, and integer of 1 to 4, an integer of 1 to 3, 1 or 2, or an integer of 1.

Provided the compound represented by formula (1) is a compound represented by one of the above formulas (C), (E), (F), (H), (I) and (K), the raw materials are readily available, which is desirable. Further, a compound represented by one of the above formulas (C), (E), (F), (H), (I) and (K), is also preferred in terms of exhibiting excellent adhesion and suppressing pickup.

The fluorine-containing ether compound of the present embodiment preferably has a number average molecular weight within a range from 1,000 to 10,000. Provided the number average molecular weight is at least 1,000, the lubricant containing the fluorine-containing ether compound of the present embodiment is more resistant to evaporation. Accordingly, evaporation of the lubricant and subsequent migration to the magnetic head can be prevented. The number average molecular weight of the fluorine-containing ether compound is more preferably 2,000 or greater. Further, provided the number average molecular weight is not more than 10,000, the viscosity of the fluorine-containing ether compound is appropriate. As a result, a lubricant layer of reduced thickness can be formed easily by application of the lubricant containing the fluorine-containing ether compound. In order to achieve a viscosity that facilitates handling when the fluorine-containing ether compound is used in a lubricant, the number average molecular weight of the fluorine-containing ether compound is preferably 4,000 or less.

The number average molecular weight refers to a value measured by $^1$H-NMR and $^{19}$F-NMR using an AVANCE III 400 manufactured by Bruker BioSpin Corporation. Specifically, the numbers of repeating units in the PFPE chains were calculated from integrals measured by $^{19}$F-NMR in order to determine the number average molecular weight. In the NMR (nuclear magnetic resonance) measurement, the sample was diluted with a hexafluorobenzene/d-acetone (1/4 v/v) solvent prior to measurement. The standard used for the $^{19}$F-NMR chemical shift was the hexafluorobenzene peak at −164.7 ppm, whereas the standard used for the $^1$H-NMR chemical shift was the acetone peak at 2.2 ppm.

[Production Method]

There are no particular limitations on the method used for producing the fluorine-containing ether compound of the present embodiment, and production may be performed using conventional production methods. For example, the fluorine-containing ether compound of the present embodiment may be produced using the production method described below.

First, an epoxy compound is synthesized that has terminal groups represented by —$CH_2$—O—$CH_2$—$R^5$ (wherein $R^5$ is an epoxy group) at both terminals of $R^1$ in formula (1). Next, the synthesized epoxy compound and a compound having —$CH_2OH$ groups at both terminals and having a perfluoropolyether chain corresponding with $R^3$ in formula (1) are reacted via a ring-opening addition reaction of the epoxy groups in the epoxy compound. This method yields a compound in which both terminals in formula (1) are hydroxyl groups (HO—$CH_2$—$R^3$—$CH_2$—$R^2$—$CH_2$—$R^1$—$CH_2$—$R^2$—$CH_2$—$R^3$—$CH_2$—OH).

Subsequently, for example, by reacting the thus obtained compound with glycidol, a compound is produced in which $R^4$ is a terminal group represented by formula (2-1). The compound obtained by this method can be separated, for example, using a method such as column chromatography.

Further, for example, the compound (HO—$CH_2$—$R^3$—$CH_2$—$R^2$—$CH_2$—$R^1$—$CH_2$—$R^2$—$CH_2$—$R^3$—$CH_2$—OH) may be used to synthesize an epoxy compound having epoxy groups at both terminals. This epoxy compound may then be reacted with a compound selected from among ethylene glycol, 2,2,3,3-fluorobutane-1,4-diol, propanediol and butanediol. By using this method, a compound can be produced that has terminals groups in which $R^4$ is represented by one of formulas (2-2), (2-3) and (2-5).

Furthermore, for example, the compound (HO—$CH_2$—$R^3$—$CH_2$—$R^2$—$CH_2$—$R^1$—$CH_2$—$R^2$—$CH_2$—$R^3$—$CH_2$—OH) may be reacted with an epoxy compound represented by formula (G) shown below that is synthesized from 3-butenyl acetate. By using this method, a compound can be produced that has terminals groups in which $R^4$ is represented by formula (2-4).

The fluorine-containing ether compound of the present embodiment is a compound represented by formula (1) shown above. Accordingly, when a lubricant layer is formed on a protective layer using a lubricant containing this compound, the surface of the protective layer is coated with the first PFPE chain represented by $R^1$ in formula (1) and the second PFPE chains represented by $R^3$. Moreover, frictional force between the magnetic head and the protective layer is reduced.

Further, the first PFPE chain is adhered tightly to the protective layer as a result of the bonding between the protective layer and the polar groups in the linking groups represented by $R^2$ that are linked to the two terminals of the first PFPE chain. Further, the second PFPE chains are adhered tightly to the protective layer as a result of the bonding between the protective layer and the polar groups in the linking groups represented by $R^2$ that are linked to the second PFPE chains on the side of the first PFPE chain, and the bonding between the protective layer and the polar groups in the terminal groups represented by $R^4$ that are linked to the outsides of the second PFPE chains. As a result, the lubricant layer and the protective layer are bound together strongly.

Further, in the lubricant layer described above, as a result of the bonding between the polar groups and the protective layer, both terminals of the first PFPE chain in the fluorine-containing ether compound and both terminals of the two second PFPE chains are adhered tightly to the protective layer. Accordingly, the first PFPE chain and the second PFPE chains are unlikely to aggregate on the protective layer, and the fluorine-containing ether compound in the lubricant layer readily spreads across the protective layer within the in-plane direction and is likely to be arranged in an elongated state. As a result, when using the lubricant containing the above fluorine-containing ether compound, it is thought that even if the thickness is reduced, a lubricant layer can be formed that can coat the surface of the protective layer with superior adhesion.

Furthermore, by forming a lubricant layer on a protective layer using a lubricant containing the fluorine-containing ether compound described above, the problem can be prevented wherein pickup is caused due to substances present in the surrounding environment (environmental substances) that have penetrated beneath the lubricant layer and the substances contaminate the magnetic recording medium. In other words, in the present invention, because the lubricant layer exhibits excellent adhesion, environmental substances such as polydimethylsiloxanes, hydrocarbons and phthalates and the like are unable to penetrate beneath the lubricant layer.

In contrast, in those cases where, for example, a compound having hydroxyl groups at both terminals of the perfluoropolyether chain is used as the fluorine-containing ether compound, if the thickness of the lubricant layer formed on the protective layer is reduced, then satisfactory adhesion cannot be achieved. It is thought that this is because of the lack of the linking groups represented by $R^2$ in formula (1). It is thought that the fluorine-containing ether compound will be more likely to aggregate on the protective layer in the thickness direction of the protective layer, and be less likely to spread evenly across the protective layer in the in-plane direction. Further, when the linking groups represented by $R^2$ in formula (1) are absent, the adhesion between the protective layer and the lubricant layer tends to be unsatisfactory, and therefore making the lubricant layer thinner is problematic.

[Lubricant for Magnetic Recording Medium]

A lubricant for a magnetic recording medium according to an embodiment of the present invention contains the fluorine-containing ether compound represented by formula (1).

In the lubricant of the present embodiment, conventional materials typically used as lubricant materials may be added and mixed as required, provided that the properties of the fluorine-containing ether compound represented by formula (1) are not impaired.

Specific examples of these conventional materials include Fomblin (a registered trademark) ZDIAC, Fomblin ZDEAL and Fomblin AM-2001 (all manufactured by Solvay Solexis S.A.), and Moresco A20H (manufactured by Moresco Corporation). Conventional materials that are mixed and used with the lubricant of the present embodiment preferably have a number average molecular weight of 1,000 to 10,000.

In those cases where the lubricant of the present embodiment contains materials other than the fluorine-containing ether compound represented by formula (1), the amount of the fluorine-containing ether compound represented by formula (1) within the lubricant of the present embodiment, relative to the total mass of the lubricant, is preferably at least 50% by mass, and more preferably 70% by mass or greater. This amount may be at least 80% by mass, or 90% by mass or greater.

Because the lubricant of the present embodiment contains the fluorine-containing ether compound represented by formula (1), even if the thickness is reduced, a lubricant layer having excellent adhesion to the protective layer can still be formed. Moreover, any fluorine-containing ether compound that exists in the lubricant layer without being bound (adsorbed) to the protective layer is unlikely to undergo aggregation. As a result, by using the lubricant of the present embodiment, a magnetic recording medium can be provided in which pickup caused by the fluorine-containing ether compound aggregating and adhering to the magnetic head is minimal.

[Magnetic Recording Medium]

FIG. 1 is a schematic cross-sectional view illustrating one embodiment of the magnetic recording medium of the present invention.

The magnetic recording medium 10 of this embodiment has a structure in which an adhesive layer 12, a soft magnetic layer 13, a first base layer 14, a second base layer 15, a magnetic layer 16, a protective layer 17, and a lubricant layer 18 are provided in sequence on a substrate 11.

[Substrate]

The substrate 11 may be selected as desired, and examples of materials that may be used include non-magnetic substrates having a film composed of NiP or a NiP alloy formed on a substrate composed of a metal or an alloy material such as Al or an Al alloy.

Further, non-magnetic substrates formed from non-metal materials such as glass, ceramic, silicon, silicon carbide, carbon or resin may be used, and non-magnetic substrates having a film composed of NiP or a NiP alloy formed on a substrate formed from one of these non-metal materials may also be used.

[Adhesive Layer]

The adhesive layer 12, when disposed so as to contact the substrate 11 and the soft magnetic layer 13 provided on top of the adhesive layer 12, prevents any progression of corrosion of the substrate 11.

The material for the adhesive layer 12 may be selected as desired, and for example, may be selected appropriately from among Cr, Cr alloys, Ti, and Ti alloys and the like. The adhesive layer 12 can be formed, for example, by a sputtering method.

[Soft Magnetic Layer]

The soft magnetic layer 13 preferably has a structure in which a first soft magnetic film, an intermediate layer formed from a Ru film, and a second soft magnetic film are stacked sequentially. In other words, the soft magnetic layer 13 preferably has a structure in which, by sandwiching an intermediate layer formed from a Ru film between two layers of soft magnetic film, the soft magnetic films above and below the intermediate layer are linked by antiferromagnetic coupling (AFC). When the soft magnetic layer 13 has an AFC coupled structure, the resistance to externally applied magnetic fields, and the durability relative to the WATER (Wide Area Track Erasure) phenomenon, which is a problem peculiar to perpendicular magnetic recording, can both be enhanced.

The first soft magnetic film and the second soft magnetic film are preferably films formed from a CoFe alloy. When the first soft magnetic film and the second soft magnetic film are films formed from a CoFe alloy, a high saturation magnetic flux density Bs (of at least 1.4 (T)) can be achieved.

Further, one of Zr, Ta and Nb is preferably added to the CoFe alloy used in forming the first soft magnetic film and the second soft magnetic film. This promotes the amorphization of the first soft magnetic film and the second soft magnetic film, which enables the orientation of the first base layer (seed layer) to be improved, and also enables a reduction in the floating height of the magnetic head.

The soft magnetic layer 13 can be formed, for example, by a sputtering method.

[First Base Layer]

The first base layer 14 is a layer for controlling the orientation and crystal size of the second base layer 15 and the magnetic layer 16 provided on top of the first base layer 14. The first base layer 14 is provided to increase the perpendicular direction component of the flux generated by the magnetic head that is perpendicular to the substrate surface, and also to fix the direction of magnetization of the magnetic layer 16 more strongly in a direction perpendicular to the substrate 11.

The first base layer 14 is preferably a layer formed from a NiW alloy. When the first base layer 14 is a layer formed from a NiW alloy, other elements such as B, Mn, Ru, Pt, Mo and Ta may be added to the NiW alloy as required.

The first base layer 14 can be formed, for example, by a sputtering method.

[Second Base Layer]

The second base layer 15 is a layer that controls the orientation of the magnetic layer 16 to achieve a more favorable orientation. The second base layer 15 is preferably a layer formed from Ru or a Ru alloy.

The second base layer 15 may be composed of a single layer, or may be composed of a plurality of layers. When the second base layer 15 is composed of a plurality of layers, all of the layers may be formed from the same material, or at least one layer may be formed from a different material.

The second base layer 15 can be formed, for example, by a sputtering method.

[Magnetic Layer]

The magnetic layer 16 is formed from a magnetic film having an easy axis of magnetization that is oriented in either the perpendicular direction or the horizontal direction relative to the substrate surface. The magnetic layer 16 is a layer containing Co and Pt, and may also contain oxides, or Cr, B, Cu, Ta or Zr or the like as necessary in order to improve the SNR characteristics.

Examples of oxides that may be included in the magnetic layer 16 include $SiO_2$, SiO, $Cr_2O_3$, CoO, $Ta_2O_3$ and $TiO_2$.

The magnetic layer 16 may be composed of a single layer, or may be composed of a plurality of magnetic layers formed from materials having different compositions.

For example, in the case where the magnetic layer 16 is composed of three layers, namely a first magnetic layer, a second magnetic layer and a third magnetic layer, the first magnetic layer preferably has a granular structure formed from a material containing Co, Cr and Pt, and also containing oxides. Examples of preferred oxides that may be used for inclusion in the first magnetic layer include oxides of Cr, Si, Ta, Al, Ti, Mg and Co. Among these, oxides such as $TiO_2$, $Cr_2O_3$ and $SiO_2$ can be used particularly favorably. Further, the first magnetic layer is preferably formed from a composite oxide containing two or more added oxides. Among such composite oxides, $Cr_2O_3$—$SiO_2$, $Cr_2O_3$—$TiO_2$, and $SiO_2$—$TiO_2$ and the like can be used particularly favorably.

The first magnetic layer may also contain, in addition to Co, Cr, Pt and the oxides, one or more elements selected from among B, Ta, Mo, Cu, Nd, W, Nb, Sm, Tb, Ru and Re. By including one or more of the above elements, micronization of the magnetic particles can be promoted, and the crystallinity and orientation can be improved. As a result, recording and playback characteristics and thermal fluctuation characteristics suitable for higher density recording can be obtained.

The same materials as those used for the first magnetic layer can be used for the second magnetic layer. The second magnetic layer preferably has a granular structure.

The third magnetic layer preferably has a non-granular structure formed from a material containing Co, Cr and Pt, but containing no oxides. In addition to Co, Cr and Pt, the third magnetic layer may also contain one or more elements selected from among B, Ta, Mo. Cu, Nd, W, Nb, Sm, Tb, Ru, Re and Mn. By including one or more of the above elements in the third magnetic layer in addition to Co, Cr and Pt, micronization of the magnetic particles can be promoted, and the crystallinity and orientation can be improved. As a result, recording and playback characteristics and thermal fluctuation characteristics suitable for higher density recording can be obtained.

In those cases where the magnetic layer 16 is composed of a plurality of magnetic layers, a non-magnetic layer is preferably provided between adjacent magnetic layers. When the magnetic layer 16 is composed of three layers, namely a first magnetic layer, a second magnetic layer and a third magnetic layer, a non-magnetic layer is preferably provided between the first magnetic layer and the second magnetic layer, and between the second magnetic layer and the third magnetic layer.

By providing a non-magnetic layer of an appropriate thickness between adjacent magnetic layers, magnetization reversal of each of the layers is easier, and the variance in the magnetization reversal over all the magnetic particles can be reduced. As a result, the S/N ratio can be improved.

Examples of materials that may be selected and used favorably for the non-magnetic layers provided between the adjacent magnetic layers of the magnetic layer 16 include Ru, Ru alloys, CoCr alloys, and CoCrX1 alloys (wherein X1 represents one or more elements selected from among Pt, Ta, Zr, Re, Ru, Cu, Nb, Ni, Mn, Ge, Si, O, N, W, Mo, Ti, V, Zr and B) and the like.

Alloy materials containing oxides, metal nitrides or metal carbides are preferably used for the non-magnetic layers provided between the adjacent magnetic layers of the magnetic layer 16. Specific examples of oxides that may be used include $SiO_2$, $Al_2O_3$, $Ta_2O_5$, $Cr_2O_3$, MgO, $Y_2O_3$ and $TiO_2$. Examples of metal nitrides that may be used include AlN, $Si_3N_4$, TaN and CrN. Examples of metal carbides that may be used include TaC, BC and SiC.

The non-magnetic layers may be formed, for example, by a sputtering method.

In order to achieve a higher recording density, the magnetic layer 16 is preferably a magnetic layer for perpendicular magnetic recording, in which the easy axis of magnetization is oriented in a direction perpendicular to the substrate surface, but in-plane magnetic recording may also be used.

The magnetic layer 16 may be formed using any conventional method such as a vapor deposition method, ion beam sputtering method or magnetron sputtering method, but is usually formed by a sputtering method.

[Protective Layer]

The protective layer 17 is a layer for protecting the magnetic layer 16. The protective layer 17 may be composed of a single layer, or may be composed of a plurality of layers. The material for the protective layer 17 may be selected as desired, and examples of materials that may be used include carbon, carbon which contains nitrogen, and silicon carbide.

Examples of the method used for depositing the protective layer 17 include sputtering methods using a target material containing carbon, CVD (chemical vapor deposition) methods using a hydrocarbon raw material such as ethylene or toluene, and IBD (ion beam deposition) methods.

[Lubricant Layer]

The lubricant layer 18 prevents contamination of the magnetic recording medium 10. Further, the lubricant layer 18 also reduces the frictional force of the magnetic head of the magnetic recording and playback device that slides across the top of the magnetic recording medium 10, and improves the durability of the magnetic recording medium 10.

As illustrated in FIG. 1, the lubricant layer 18 is formed so a, to contact the protective layer 17. The lubricant layer 18 is formed by applying the magnetic recording medium lubricant of the embodiment described above to the protective layer 17. Accordingly, the lubricant layer 18 contains the fluorine-containing ether compound described above.

In those cases where the protective layer 17 disposed beneath the lubricant layer 18 is formed from carbon, carbon which contains nitrogen, or silicon carbide, the lubricant layer 18 bonds to the protective layer 17 with powerful bonding strength due to the fluorine-containing ether compound contained in the layer. As a result, even if the thickness of the lubricant layer 18 is reduced, a magnetic recording medium 10 in which the surface of the protective layer 17 is coated with a high coverage rate can be obtained easily. Consequently, contamination of the surface of the magnetic recording medium 10 can be effectively prevented.

The average thickness of the lubricant layer 18 may be selected as desired, but is preferably from 0.5 nm (5 Å) to 3 nm (30 Å), and more preferably from 0.5 nm (5 Å) to 2 nm (20 Å).

Provided the average thickness of the lubricant layer 18 is at least 0.5 nm, the lubricant layer 18 is formed with uniform thickness without becoming an island-like or network-like layer. As a result, the surface of the protective layer 17 can be coated with the lubricant layer 18 with a high coverage rate. Further, by ensuring that the average thickness of the lubricant layer 18 is not more than 3 nm, the floating height of the magnetic head can be kept satisfactorily small, and the recording density of the magnetic recording medium 10 can be increased.

When the surface of the protective layer 17 is not coated with the lubricant layer 18 with a satisfactorily high coverage rate, environmental substances adsorbed to the surface of the magnetic recording medium 10 can pass through voids in the lubricant layer 18 and penetrate beneath the lubricant layer 18. Environmental substances that penetrate beneath the lubricant layer 18 can adsorb and bond to the protective layer 17, producing contaminants. Then, during magnetic recording or playback, these contaminants (aggregated components) can undergo pickup by the magnetic head, and may cause damage to the magnetic head, or cause a deterioration in the magnetic recording and playback characteristics of the magnetic recording and playback device.

[Lubricant Layer Formation Method]

One example of the method used for forming the lubricant layer 18 is a method in which a partially produced magnetic recording medium is first prepared having each of the layers up to and including the protective layer 17 formed on the substrate 11, and a solution for forming the lubricant layer is then applied to the protective layer 17.

The solution for forming the lubricant layer is obtained, for example, by diluting the magnetic recording medium lubricant of the embodiment described above with a solvent as necessary, so as to achieve a viscosity and concentration that are suitable for the coating method.

Examples of the solvent used in the solution for forming the lubricant layer include fluorine-based solvents such as Vertrel (a registered trademark) XF (a product name, manufactured by Mitsui DuPont Fluorochemicals Co., Ltd.) and the like.

There are no particular limitations on the coating method used for applying the solution for forming the lubricant layer, and examples include spin-coating methods and dipping methods.

When a dipping method is used, for example, the method described below may be used. First, the substrate 11 having the various layer up to and including the protective layer 17 is dipped in the solution for forming the lubricant layer which is placed in the dipping tank of a dip coating device. Subsequently, the substrate 11 is pulled up out of the dipping tank at a prescribed speed. This coats the solution for forming the lubricant layer onto the protective layer 17 of the substrate 11.

By using a dipping method, the solution for forming the lubricant layer can be applied uniformly to the surface of the protective layer 17, enabling the lubricant layer 18 to be formed with uniform thickness on the protective layer 17.

The magnetic recording medium 10 of the present embodiment has at least the magnetic layer 16, the protective layer 17 and the lubricant layer 18 provided sequentially on the substrate 11. In the magnetic recording medium 10 of the present embodiment, the lubricant layer 18 containing the fluorine-containing ether compound described above is formed so as to contact the protective layer 17. Even if the thickness of this lubricant layer 18 is reduced, the surface of the protective layer 17 can be coated with a high coverage rate.

Accordingly, in the magnetic recording medium 10 of the present embodiment, the problem of environmental materials that can produce contaminants, such as ionic impurities, penetrating through voids in the lubricant layer 18 can be prevented. Accordingly, the magnetic recording medium 10 of the present embodiment is a medium in which few contaminants exist on the surface. Further, the lubricant layer 18 in the magnetic recording medium 10 of the present embodiment is unlikely to suffer from pickup.

EXAMPLES

The present invention is described below in further detail using a series of examples and comparative examples. However, the present invention is not limited solely to the following examples.

Example 1

A 500 mL round-bottom flask was charged with 1H,1H, 11H,11H-dodecafluoro-3,6,9-trioxaundecane-1,11-diol (10 g), acetone (150 mL), and 7.8 g of an aqueous solution of sodium hydroxide (NaOH/water=3.9 g/3.9 g) to produce a mixture. The thus obtained mixture was heated, and stirred under reflux at 75° C. for one hour.

Next, epibromohydrin (28 mL) was added to the above mixture, and the resulting mixture was stirred under reflux at 75° C. for 5 hours, and was then cooled to 25° C. Subsequently, ethyl acetate was added to the round-bottom flask, the flask contents were washed with water, and the organic phase inside the round-bottom flask was collected. Sodium sulfate was then added to the collected organic phase to perform dewatering, and the mixture was then filtered through a filter. Subsequently, an evaporator was used to remove the solvent from the filtrate by distillation. A distillation under reduced pressure (130° C., 6.7×10$^{-5}$ MPa) was then performed to obtain a colorless and transparent liquid compound 1 (18 g) represented by a formula (A) shown below.

$^{1}$H-NMR and $^{19}$F-NMR measurements of the obtained compound 1 were performed, and the structure was identified based on the following results.

(Identification Data)

$^{1}$H-NMR (acetone-D$_6$): δ [ppm]=2.60 (2H), 2.77 (2H), 3.15 (2H), 3.56 (2H), 4.04 (6H)

$^{19}$F-NMR (acetone-D$_6$): δ [ppm]=−89.63 to −89.35 (4F), −89.27 to −89.13 (4F), −79.04 to −78.73 (4F)

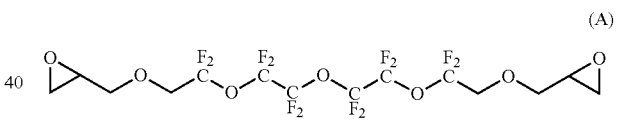

(A)

Next, under a nitrogen gas atmosphere, a 100 mL round-bottom flask was charged, with the compound 1 represented by formula (A) (1 g) and a fluoropolyether represented by HOCH$_2$CF$_2$O(CF$_2$CF$_2$O)$_x$(CF$_2$O)$_y$CF$_2$CH$_2$OH (wherein x=1 to 7, y=1 to 7, number average molecular weight: 800, molecular weight distribution: 1.1) (28 g), and stirring was performed until a uniform mixture was obtained. Subsequently, 0.8 g of potassium carbonate was added to the mixture, and the mixture was heated to 70° C. The mixture was then stirred for 15 hours at 70° C. and was then cooled to 25° C.

Subsequently, a neutralization was performed by adding hydrochloric acid to the round-bottom flask. A fluorine-based solvent (product name: ASAHIKLIN (a registered trademark) AK-225, manufactured by Asahi Glass Co., Ltd.) was then added to the mixture, the flask contents were washed with water, and the organic phase inside the round-bottom flask was collected. Sodium sulfate was then added to the collected organic phase to perform dewatering, and the mixture was then filtered through a filter. Subsequently, an evaporator was used to remove the solvent from the filtrate by distillation. A supercritical extraction using carbon dioxide was then performed under conditions of 60° C. and 14 MPa, thus obtaining a colorless and transparent liquid compound 2 (3 g) represented by a formula (B) shown below. Rf in the following formula (B) is represented by formula (RF) shown below.

¹H-NMR and ¹⁹F-NMR measurements of the obtained compound 2 were performed, and the structure was identified based on the following results.
(Identification Data)
¹H-NMR (acetone-$D_6$): δ [ppm]=3.74 to 3.81 (4H), 3.81 to 4.02 (10H), 4.04 to 4.16 (8H)
¹⁹F-NMR (acetone-$D_6$): δ [ppm]=−91.15 to −88.51 (36F), −83.19 (2F), −81.23 (2F), −80.61 (2F), −78.81 to −78.45 (6F), −55.65 to −51.59 (12F)

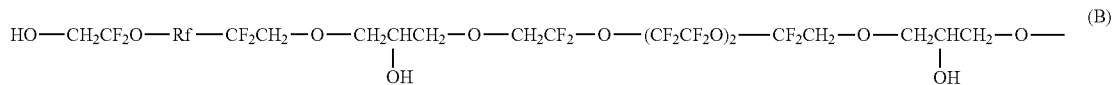

(B)

(RF)

(In formula (RF), x represents an integer of 1 to 7, and y represents an integer of 1 to 7.)

Next, under a nitrogen gas atmosphere, a 300 mL round-bottom flask was charged with the compound 2 represented by formula (B) (4 g) and t-butanol (40 mL). Stirring was performed until a uniform mixture was obtained. Subsequently, potassium tert-butoxide (0.1 g) was added to the mixture, and the mixture was heated to 70° C. Glycidol (250 μL) was then added, and the resulting mixture was then stirred for 8 hours at 70° C., and then cooled to 25° C.

Subsequently, a neutralization was performed by adding hydrochloric acid to the round-bottom flask. A fluorine-based solvent (product name: ASAHIKLIN (a registered trademark) AK-225, manufactured by Asahi Glass Co., Ltd.) was then added, the flask contents were washed with water, and the organic phase inside the round-bottom flask was collected. Sodium sulfate was then added to the collected organic phase to perform dewatering, and the mixture was then filtered through a filter. Subsequently, an evaporator was used to remove the solvent from the filtrate by distillation. The resulting residue was separated by column chromatography. The above steps yielded a colorless and transparent liquid compound 3 (0.9 g) represented by a formula (C) shown below. Rf in the following formula (C) is represented by formula (RF) shown above.

¹H-NMR and ¹⁹F-NMR measurements of the obtained compound 3 were performed, and the structure was identified based on the following results.
(Identification Data)
¹H-NMR (acetone-$D_6$): δ [ppm]=3.42 to 3.59 (2H), 3.61 to 3.83 (9H), 3.83 to 4.04 (9H), 4.04 to 4.28 (12H)
¹⁹F-NMR (acetone-$D_6$): δ [ppm]=−91.15 to −88.51 (36F), −80.60 (4F), −78.81 to −78.45 (8F), −55.65 to −51.59 (12F)

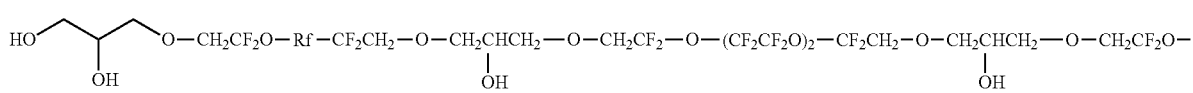

(C)

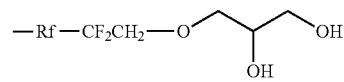

Example 2

Under a nitrogen gas atmosphere, a 300 mL round-bottom flask was charged with the compound 2 represented by formula (B) (4 g) and t-butanol (40 mL), and stirring was performed until a uniform mixture was obtained. Next, epibromohydrin (2.9 mL) and potassium tert-butoxide (0.3 g) were added to the mixture, and the mixture was stirred for 9 hours while heating at 70° C. The mixture was then cooled to 25° C.

Subsequently, a fluorine-based solvent (product name: ASAHIKLIN (a registered trademark) AK-225, manufactured by Asahi Glass Co., Ltd.) was added to the round-bottom flask, and the product of the above reaction was washed with water. The product was then collected, dewatered and filtered, and the resulting residue separated by column chromatography, in the same manner as that described for the compound 3 represented by formula (C). The above steps yielded a colorless and transparent liquid compound 4 (0.7 g) represented by a formula (D) shown below. Rf in the following formula (D) is represented by formula (RF) shown above.

1H-NMR and $^{19}$F-NMR measurements of the obtained compound 4 were performed, and the structure was identified based on the following results.

(Identification Data)

$^1$H-NMR (acetone-D$_6$): δ [ppm]=2.59 (2H), 2.76 (2H), 3.11 (2H), 3.56 (2H), 3.73 to 3.81 (5H), 3.81 to 4.18 (19H)

$^{19}$F-NMR (acetone-D$_6$): δ [ppm]=−91.15 to −88.51 (36F), −80.88 to −80.34 (4F), −78.93 to −78.30 (8F), −55.65 to −51.59 (12F)

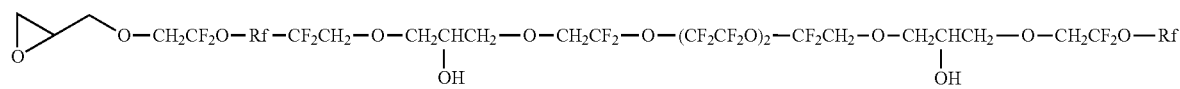

(D)

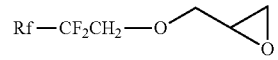

Under a nitrogen gas atmosphere, a 300 mL round-bottom flask was charged with the compound 4 represented by formula (D) (4 g) and t-butanol (10 mL), and stirring was performed until a uniform mixture was obtained. Subsequently, ethylene glycol (2 mL) and potassium tert-butoxide (0.15 g) were added to the mixture, and the resulting mixture was stirred for 9 hours while heating at 70° C. The mixture was then cooled to 25° C.

Subsequently, a neutralization was performed by adding hydrochloric acid to the round-bottom flask. The product was then washed with water, collected, dewatered and filtered, and the resulting residue then separated by column chromatography, in the same manner as that described for the compound 3 represented by formula (C) in Example 1.

The above steps yielded a colorless and transparent liquid compound 5 (0.7 g) represented by a formula (E). Rf in the following formula (E) is represented by formula (RF) shown above.

$^1$H-NMR and $^{19}$F-NMR measurements of the obtained compound 5 were performed, and the structure was identified based on the following results.

(Identification Data)

1H-NMR (acetone-D$_6$): δ [ppm]=3.46 to 3.63 (8H), 3.65 to 3.81 (10H), 3.81 to 4.18 (22H)

$^{19}$F-NMR (acetone-D$_6$): δ [ppm]=−91.15 to −88.51 (36F), −80.78 to −80.38 (4F), −78.80 to −78.38 (8F), −55.65 to −51.59 (12F)

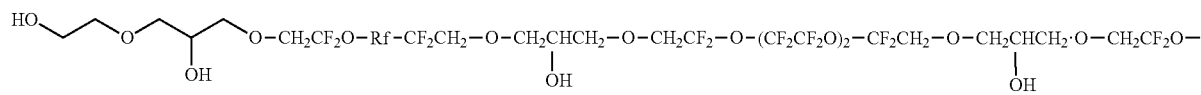

(E)

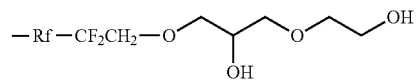

Example 3

Under a nitrogen gas atmosphere, a 300 mL round-bottom flask was charged with the compound 4 represented by formula (D) (4 g) and t-butanol (10 mL), and stirring was performed until a uniform mixture was obtained. Subsequently, 2,2,3,3-fluorobutane-1,4-diol (5 g) and potassium tert-butoxide (0.15 g) were added to the mixture, and the resulting mixture was stirred for 9 hours while heating at 70° C. The mixture was then cooled to 25° C.

Subsequently, a neutralization was performed by adding hydrochloric acid to the round-bottom flask. The product was then washed with water, collected, dewatered and filtered, and the resulting residue then separated by column chromatography, in the same manner as that described for the compound 3 represented by formula (C) in Example 1. The above steps yielded a colorless and transparent liquid compound 6 (0.7 g) represented by a formula (F). Rf in the following formula (F) is represented by formula (RF) shown above.

$^1$H-NMR and $^{19}$F-NMR measurements of the obtained compound 6 were performed, and the structure was identified based on the following results.
(Identification Data)
$^1$H-NMR (acetone-D$_6$): δ [ppm]=3.67 to 4.05 (24H), 4.05 to 4.22 (16H)
$^{19}$F-NMR (acetone-D$_6$): δ [ppm]=−125.27 (4F), −123.31 (4F), −91.15 to −88.51 (36F), −83.21 (1F), −81.22 (1F), −80.78 to −80.38 (3F), −78.80 to −78.38 (7F), −55.65 to −51.59 (12F)

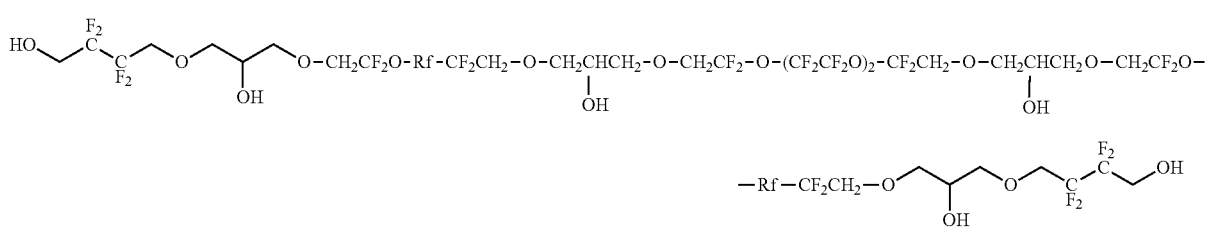

(F)

Example 4

A 500 mL round-bottom flask was charged with 3-butenyl acetate (6.0 g), dichloromethane (100.0 mL and sodium bicarbonate (8.7 g), and stirring was performed until a uniform mixture was obtained. Subsequently, the mixture was cooled in ice to 0° C., and m-chloroperbenzoic acid (15.5 g) was added and stirred for one hour. Stirring was then continued at 25° C. for 6 hours, thus obtaining a reaction product. Next, the reaction product was cooled in ice to 0° C. Subsequently, a saturated aqueous solution of sodium bicarbonate (20 mL) and a saturated aqueous solution of sodium sulfite (20 mL) were added, and the mixture was stirred for 0.5 hours. The thus obtained reaction product was then washed with water, and the product was collected, dewatered and filtered, and the resulting residue separated by column chromatography, in the same manner as that described for the compound 3 represented by formula (C). The above steps yielded a colorless and transparent liquid compound 7 (3.2 g) represented by formula (G) shown below.

A 1H-NMR measurement of the obtained compound 7 was performed, and the structure was identified based on the following results.

(Identification Data)
1H-NMR (acetone-D$_6$): δ [ppm]=1.73 (1H), 1.88 (1H), 2.01 (3H), 2.41 (1H), 2.67 (1H), 2.88 (1H), 4.12 (2H)

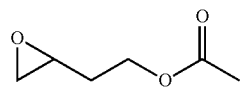

(G)

Under a nitrogen gas atmosphere, a 100 mL round-bottom flask was charged with the compound 2 represented by formula (B) (6.3 g) and the compound 7 represented by formula (G) (0.3 mL), and stirring was performed until a uniform mixture was obtained. Subsequently, potassium tert-butoxide (0.59 g) was added to the mixture, and the mixture was stirred for 7 hours while heating at 70° C. The mixture was then cooled to 25° C.

Subsequently, a fluorine-based solvent (product name: ASAHIKLIN (a registered trademark) AK-225, manufactured by Asahi Glass Co., Ltd.) was added to the round-bottom flask, and the product of the above reaction was washed with water. The product was then collected, dewatered and filtered, and the resulting residue separated by column chromatography, in the same manner as that described for the compound 3 represented by formula (C). The above steps yielded a colorless and transparent liquid compound 8 (1.0 g) represented by a formula (H) shown below. Rf in the following formula (H) is represented by formula (RF) shown above.

1H-NMR and $^{19}$F-NMR measurements of the obtained compound 8 were performed, and the structure was identified based on the following results.

(Identification Data)

$^1$H-NMR (acetone-$D_6$): δ [ppm]=1.54 to 1.76 (4H), 3.42 to 3.59 (2H), 3.61 to 3.83 (9H), 3.83 to 4.04 (9H), 4.04 to 4.28 (12H)

$^{19}$F-NMR (acetone-$D_6$): δ [ppm]=−91.15 to −88.51 (36F), −80.78 to −80.38 (4F), −78.80 to −78.38 (8F), −55.65 to −51.59 (12F)

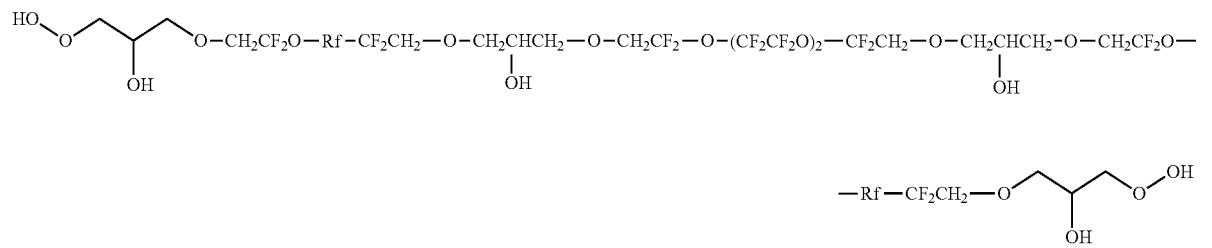

(H)

Example 5

Under a nitrogen gas atmosphere, a 300 mL round-bottom flask was charged with the compound 4 represented by formula (D) (4 g) and t-butanol (10 mL), and stirring was performed until a uniform mixture was obtained. Subsequently, propanediol (2 mL) and potassium tert-butoxide (0.15 g) were added to the mixture, and the resulting mixture was stirred for 9 hours while heating at 70° C. The mixture was then cooled to 25° C.

Subsequently, a neutralization was performed by adding hydrochloric acid to the round-bottom flask. The product was then washed with water, collected, dewatered and filtered, and the resulting residue then separated by column chromatography, in the same manner as that described for the compound 3 represented by formula (C) in Example 1. The above steps yielded a colorless and transparent liquid compound 9 (0.7 g) represented by a formula (I). Rf in the following formula (I) is represented by formula (RF) shown above.

$^1$H-NMR and $^{19}$F-NMR measurements of the obtained compound 9 were performed, and the structure was identified based on the following results.

(Identification Data)

1H-NMR (acetone-$D_6$): δ [ppm]=1.79 (4H), 3.46 to 3.63 (8H), 3.65 to 3.81 (10H), 3.81 to 4.18 (22H)

$^{19}$F-NMR (acetone-$D_6$): δ [ppm]=−91.15 to −88.51 (36F), −80.78 to −80.38 (4F), −78.80 to −78.38 (8F), −55.65 to −51.59 (12F)

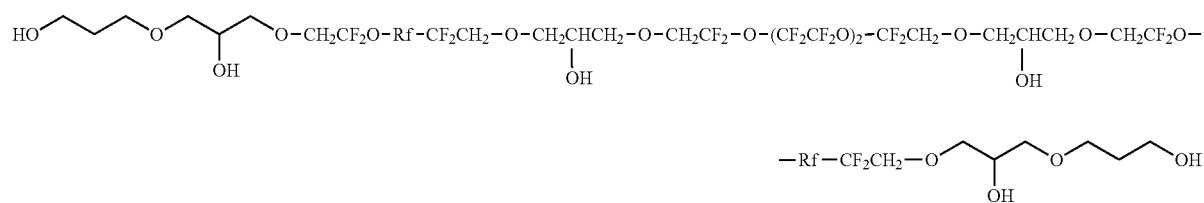

(I)

Example 6

Under a nitrogen gas atmosphere, a 500 mL round-bottom flask was charged with a fluoropolyether represented by HOCH$_2$CF$_2$O(CF$_2$CF$_2$O)$_m$(CF$_2$O)$_n$CF$_2$CH$_2$OH (wherein m=1 to 7, n=1 to 7, number average molecular weight: 800, molecular weight distribution: 1.1) (10 g), t-butanol (15 mL) and potassium tert-butoxide (1.0 g), thus forming a mixture. The thus obtained mixture was stirred for one hour while heating at 70° C.

Next, epibromohydrin (4.0 g) was added dropwise to the above mixture, and the resulting mixture was stirred for 5 hours while heating at 70° C. The mixture was then cooled to 25° C. Subsequently, a fluorine-based solvent (product name: ASAIHIKLIN (a registered trademark) AK-225, manufactured by Asahi Glass Co., Ltd.) was added to the round-bottom flask, and the product of the above reaction was washed with water. The product was then collected, dewatered and filtered, and the resulting residue separated by column chromatography, in the same manner as that described for the compound 3 represented by formula (C). The above steps yielded a colorless and transparent liquid compound 10 (8.0 g) represented by a formula (J).

1H-NMR and $^{19}$F-NMR measurements of the obtained compound 10 were performed, and the structure was identified based on the following results.
(Identification Data)
1H-NMR (acetone-D$_6$): δ [ppm]=2.60 (2H), 2.77 (2H), 3.12 (2H), 3.57 (2H), 3.70 to 4.29 (6H)
$^{19}$F-NMR (acetone-D$_6$): δ [ppm]=−91.15 to −88.51 (16F), −80.61 (2F), −78.75 (2F), −55.65 to −51.59 (8F)

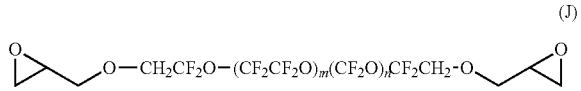
(J)

(In formula (J), m represents an integer of 1 to 7, and n represents an integer of 1 to 7.)

With the exceptions of using the compound 10 represented by formula (J) instead of the compound 1 represented by formula (A), and using a fluoropolyether represented by HOCH$_2$CF$_2$O(CF$_2$CF$_2$O)$_y$CF$_2$CH$_2$OH (wherein z=1 to 10, number average molecular weight: 800, molecular weight distribution: 1.02) instead of the fluoropolyether represented by HOCH$_2$CF$_2$O(CF$_2$CF$_2$O)$_x$(CF$_2$O)$_y$CF$_2$CH$_2$OH (wherein x=1 to 7, y=1 to 7, number average molecular weight: 800, molecular weight distribution: 1.1), a colorless and transparent liquid compound 11 (1.0 g) represented by a formula (K) shown below was obtained in the same manner as the compound 3 represented by formula (C) in Example 1. Rf in the following formula (K) is represented by formula (RF) shown above, and Rf$_1$ is represented by a formula (RF-1) shown below.

1H-NMR and $^{19}$F-NMR measurements of the obtained compound 11 were performed, and the structure was identified based on the following results.
(Identification Data)
1H-NMR (acetone-D$_6$): δ [ppm]=3.70 to 4.05 (24H), 4.05 to 4.20 (8H)
$^{19}$F-NMR (acetone-D$_6$): δ [ppm]=−91.15 to −88.51 (62F), −80.61 (2F), −78.75 (1° F.), −55.65 to −51.59 (8F)

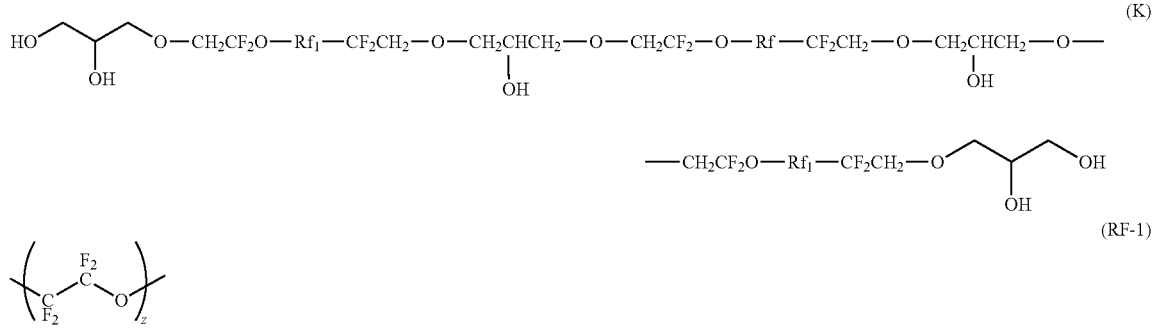

(In formula (RF-1), z represents an integer of 1 to 10.)

Comparative Example 1

The compound 2 represented by formula (B) and synthesized in Example 1 was used.

Comparative Example 2

Under a nitrogen gas atmosphere, a 100 mL round-bottom flask was charged with the compound 1 represented by formula (A) (1 g) and a fluoropolyether represented by HOCH$_2$CF$_2$O(CF$_2$CF$_2$O)$_z$CF$_2$CH$_2$OH (wherein z=1 to 10, number average molecular weight: 800, molecular weight distribution: 1.02) (28 g), and stirring was performed until a uniform mixture was obtained. Subsequently, potassium carbonate (0.8 g) was added to the mixture, and the mixture was stirred for 8 hours while heating at 70° C. The mixture was then cooled to 25° C.

Subsequently, a neutralization was performed by adding hydrochloric acid to the round-bottom flask. The product was then washed with water, collected, dewatered, filtered and extracted in the same manner as that described for the compound 2 represented by formula (B) in Example 1. The above steps yielded a colorless and transparent liquid compound 12 (3.2 g) represented by a formula (L). Rf$_1$ in the following formula (L) is represented by formula (RF-1) shown above.

$^1$H-NMR and $^{19}$F-NMR measurements of the obtained compound 12 were performed, and the structure was identified based on the following results.
(Identification Data)
1H-NMR (acetone-D$_6$): δ [ppm]=3.71 to 3.81 (4H), 3.80 to 4.02 (10H), 4.05 to 4.20 (8H)
$^{19}$F-NMR (acetone-D$_6$): δ [ppm]=−91.15 to −88.51 (48F), −81.40 to −80.85 (4F), −78.81 to −78.45 (8F)

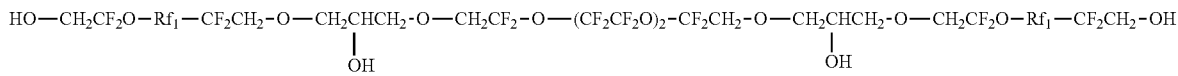

(L)

Comparative Example 3

Under a nitrogen gas atmosphere, a 50 mL round-bottom flask was charged with the compound 12 represented by formula (L) (4 g) and t-butanol (40 mL), and stirring was performed until a uniform mixture was obtained. Subsequently, potassium tert-butoxide (0.5 g) was added to the mixture, and with the mixture being heated at 70° C., glycidol (250 μL) was added, and the resulting mixture was stirred for 8 hours. The mixture was then cooled to 25° C.

Subsequently, a neutralization was performed by adding hydrochloric acid to the round-bottom flask. The product was then washed with water, collected, dewatered and filtered, and the resulting residue then separated by column chromatography, in the same manner as that described for the compound 3 represented by formula (C) in Example 1. The above steps yielded a colorless and transparent liquid compound 13 (1.0 g) represented by a formula (M). $Rf_1$ in the following formula (M) is represented by formula (RF-1) shown above.

1H-NMR and $^{19}$F-NMR measurements of the obtained compound 13 were performed, and the structure was identified based on the following results.
(Identification Data)

$^1$H-NMR (acetone-$D_6$): δ [ppm]=3.71 to 3.81 (12H), 3.80 to 4.02 (12H), 4.05 to 4.20 (8H)

$^{19}$F-NMR (acetone-$D_6$): δ [ppm]=−91.15 to −88.51 (48F), −78.81 to −78.45 (12F)

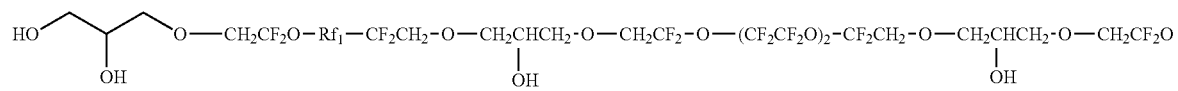

(M)

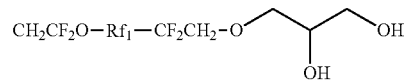

Comparative Example 4

With the exceptions of using the compound 10 represented by formula (J) instead of the compound 1 represented by formula (A), and altering the amount used of the fluoropolyether represented by $HOCH_2CF_2O(CF_2CF_2O)_x(CF_2O)_yCF_2CH_2OH$ (wherein x=1 to 7, y=1 to 7, number average molecular weight: 800, molecular weight distribution: 1.1) to 20 g, a colorless and transparent liquid compound 14 (2.4 g) represented by a formula (N) shown below was obtained in the same manner as the compound 2 represented by formula (B) in Example 1. Rf in the following formula (N) is represented by formula (RF) shown above.

$^1$H-NMR and $^{19}$F-NMR measurements of the obtained compound 14 were performed, and the structure was identified based on the following results.
(Identification Data)

$^1$H-NMR (acetone-$D_6$): δ [ppm]=3.74 to 3.81 (4H), 3.81 to 4.16 (18H)

$^{19}$F-NMR (acetone-$D_6$): δ [ppm]=−91.15 to −88.51 (42F), −83.20 (2F), −81.25 (2F), −80.61 (4F), −78.75 (4F), −55.65 to −51.59 (18F)

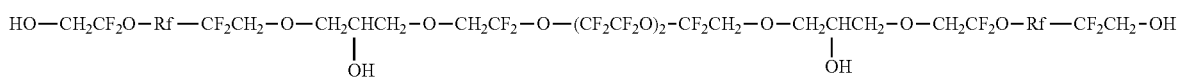
(N)

Comparative Example 5

Under a nitrogen gas atmosphere, a 50 mL round-bottom flask was charged with the compound 14 represented by formula (N) (3.5 g) and t-butanol (40 mL), and stirring was performed until a uniform mixture was obtained. Subsequently, potassium tert-butoxide (0.1 g) was added to the mixture, and with the mixture being heated at 70° C. glycidol (250 μL) was added, and the resulting mixture was stirred for 8 hours. The mixture was then cooled to 25° C.

Subsequently, a neutralization was performed by adding hydrochloric acid to the round-bottom flask, and the product was then washed with water, collected, dewatered and filtered, and the resulting residue then separated by column chromatography, in the same manner as that described for the compound 3 represented by formula (C) in Example 1. The above steps yielded a colorless and transparent liquid compound 15 (0.9 g) represented by a formula (O). Rf in the following formula (O) is represented by formula (RF) shown above.

$^1$H-NMR and $^{19}$F-NMR measurements of the obtained compound 15 were performed, and the structure was identified based on the following results.
(Identification Data)
1H-NMR (acetone-D$_6$): δ [ppm]=3.41 to 3.81 (11H), 3.81 to 4.16 (21H)
$^{19}$F-NMR (acetone-D$_6$): δ [ppm]=−91.15 to −88.51 (42F), −80.61 (6F), −78.75 (6F), −55.65 to −51.59 (18F)

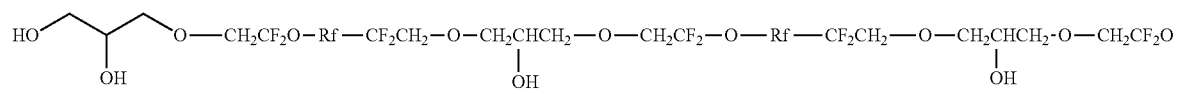
(O)

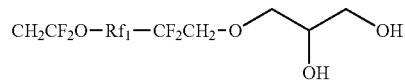

Comparative Example 6

Fomblin Z-tetraol manufactured by Solvay Solexis S.A. (molecular weight: about 2,000, shown below in formula (P)) was used. This compound was termed compound 16.

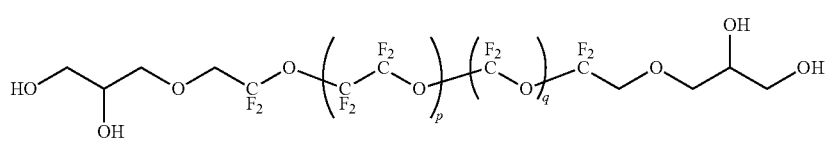
(P)

(In formula (P), p represents an integer of 1 to 10, and q represents an integer of 1 to 10.)

The structures of $R^1$ to $R^4$ when the compounds of Examples 1 to 6 and Comparative Examples 1 to 6 obtained in the manner described above are represented using formula (1) are summarized in Table 1 using the above formulas. Further, the number average molecular weights of the compounds of Examples 1 to 6 and Comparative Examples 1 to 6 were determined from the above $^1$H-NMR and $^{19}$F-NMR measurements. The results are shown in Table 2.

TABLE 1

| | Compound | Formula | $R^1$ | $R^2$ | $R^3$ | $R^4$ |
|---|---|---|---|---|---|---|
| Example 1 | 3 | C | Formula (RF-2) d = 2 | Formula (6) w = 1 | Formula (3-1) n = 1 to 7, m = 1 to 7 | Formula (2-1) r = 0 |
| Example 2 | 5 | E | Formula (RF-2) d = 2 | Formula (6) w = 1 | Formula (3-1) n = 1 to 7, m = 1 to 7 | Formula (2-2) p = 1 |
| Example 3 | 6 | F | Formula (RF-2) d = 2 | Formula (6) w = 1 | Formula (3-1) n = 1 to 7, m = 1 to 7 | Formula (2-3) s = 2 |
| Example 4 | 8 | H | Formula (RF-2) d = 2 | Formula (6) w = 1 | Formula (3-1) n = 1 to 7, m = 1 to 7 | Formula (2-4) t = 1 |
| Example 5 | 9 | I | Formula (RF-2) d = 2 | Formula (6) w = 1 | Formula (3-1) n = 1 to 7, m = 1 to 7 | Formula (2-5) q = 2 |
| Example 6 | 11 | K | Formula (RF-3) e = 1 to 7, f = 1 to 7 | Formula (6) w = 1 | Formula (3-2) g = 1 to 10 | Formula (2-1) r = 0 |
| Comparative Example 1 | 2 | B | Formula (RF-2) d = 2 | Formula (6) w = 1 | Formula (3-1) n = 1 to 7, m = 1 to 7 | hydroxyl group |
| Comparative Example 2 | 12 | L | Formula (RF-2) d = 2 | Formula (6) w = 1 | Formula (3-2) g = 1 to 10 | hydroxyl group |
| Comparative Example 3 | 13 | M | Formula (RF-2) d = 2 | Formula (6) w = 1 | Formula (3-2) g = 1 to 10 | Formula (2-1) r = 0 |
| Comparative Example 4 | 14 | N | Formula (RF-3) e = 1 to 7, f = 1 to 7 | Formula (6) w = 1 | Formula (3-1) n = 1 to 7, m = 1 to 7 | hydroxyl group |
| Comparative Example 5 | 15 | O | Formula (RF-3) e = 1 to 7, f = 1 to 7 | Formula (6) w = 1 | Formula (3-1) n = 1 to 7, m = 1 to 7 | Formula (2-1) r = 0 |
| Comparative Example 6 | 16 | P | Formula (P) p = 1 to 10, q = 1 to 10 | none | none | Formula (2-1) r = 0 |

TABLE 2

| | Compound | Formula | Number average molecular weight | Film thickness (Å) | Bonding ratio | Pickup suppression test | Overall evaluation |
|---|---|---|---|---|---|---|---|
| Example 1 | 3 | C | 2259 | 10.0 | 72% | ○ | ◉ | ◉ |
| Example 2 | 5 | E | 2347 | 9.5 | 77% | ○ | ◉ | ◉ |
| Example 3 | 6 | F | 2547 | 10.0 | 75% | ○ | ◉ | ◉ |
| Example 4 | 8 | H | 2287 | 10.0 | 74% | ○ | ◉ | ◉ |
| Example 5 | 9 | I | 2375 | 10.0 | 75% | ○ | ◉ | ◉ |
| Example 6 | 11 | K | 2488 | 10.0 | 70% | ○ | ◉ | ◉ |
| Comparative Example 1 | 2 | B | 2109 | 10.5 | 40% | X | X | X |
| Comparative Example 2 | 12 | L | 2133 | 9.5 | 42% | X | X | X |
| Comparative Example 3 | 13 | M | 2240 | 10.0 | 69% | ○ | X | X |
| Comparative Example 4 | 14 | N | 2458 | 10.0 | 38% | X | X | X |

TABLE 2-continued

| | Compound | Formula | Number average molecular weight | Film thickness (Å) | Bonding ratio | | Pickup suppression test | Overall evaluation |
|---|---|---|---|---|---|---|---|---|
| Comparative Example 5 | 15 | O | 2572 | 10.0 | 65% | ○ | X | X |
| Comparative Example 6 | 16 | P | 2114 | 10.0 | 45% | X | X | X |

(◎: extremely good, ○: good, X: poor)

Next, using the method described below, the compounds obtained in Examples 1 to 6 and Comparative Examples 1 to 6 were used to prepare a series of solutions for forming lubricant layers. Using each of the obtained solutions for forming a lubricant layer, the method described below was used to form a lubricant layer on a magnetic recording medium, thus obtaining magnetic recording media of Examples 1 to 6 and Comparative Examples 1 to 6.
[Solution for Forming Lubricant Layer]

The compounds obtained in Examples 1 to 6 and Comparative Examples 1 to 6 were each dissolved in a fluorine-based solvent Vertrel (a registered trademark) XF (a product name, manufactured by Mitsui DuPont Fluorochemicals Co., Ltd.). The solution was then diluted with Vertrel (a registered trademark) so that the film thickness upon application to a protective layer was 9 Å to 11 Å, thus completing preparation of a solution for forming a lubricant layer.
[Magnetic Recording Medium]

A magnetic recording medium was prepared having an adhesive layer, a soft magnetic layer, a first base layer, a second base layer, a magnetic layer and a protective layer provided sequentially on a substrate having a diameter of 65 nm. The protective layer was formed from carbon.

The solutions for forming a lubricant layer of Examples 1 to 6 and Comparative Examples 1 to 6 were each applied by a dipping method to the protective layer of a magnetic recording medium having each of the above layers up to and including the protective layer already formed. The dipping was performed under conditions including an immersion speed of 10 mm/sec, an immersion time of 30 sec, and a withdrawal speed of 1.2 mm/sec.

Subsequently, the magnetic recording medium with the applied solution for forming a lubricant layer was placed in a 120° C. thermostatic oven and heated for 10 minutes, thereby removing the solvent from the solution for forming a lubricant layer. The above process yielded a magnetic recording medium having a lubricant layer formed on the protective layer.

The film thickness of the lubricant layer on each of the magnetic recording media of Examples 1 to 6 and Comparative Examples 1 to 6 obtained in this manner was measured using an FT-IR (product name: Nicolet iS50, manufactured by Thermo Fisher Scientific Inc.). The results are shown in Table 2.

Further, using the methods described below, each of the magnetic recording media of Examples 1 to 6 and Comparative Examples 1 to 6 was evaluated by measuring the adhesion between the lubricant layer and the protective layer (the bonding ratio), and performing a pickup suppression test. The results are shown in Table 2.
(Measurement of Adhesion (Bonding Ratio) between Lubricant Layer and Protective Layer)

The magnetic recording medium having a formed lubricant layer was washed using a method in which the magnetic recording medium was immersed in the solvent Vertrel (a registered trademark) for 10 minutes and then withdrawn from the solvent. Immersion of the magnetic recording medium in the solvent was performed at a speed of 10 mm/sec. whereas the withdrawal speed was 1.2 mm/sec.

Subsequently, using the same method as that used for measuring the film thickness of the lubricant layer prior to the washing, the film thickness of the lubricant layer was re-measured.

The film thickness of the lubricant layer prior to washing was deemed A, the film thickness of the lubricant layer after washing (after solvent immersion) was deemed B, and the bonding ratio of the lubricant layer was calculated from $((B/A) \times 100(\%))$. Using the calculated bonding ratio, the adhesion between the lubricant layer and the protective layer was evaluated against the criteria listed below. If the adhesion between the lubricant layer and the protective layer is poor, then a portion of the lubricant molecules from the lubricant layer are dissolved in the Vertrel and washed away. This results in a reduction in the film thickness of the lubricant layer following washing.
[Evaluation of Adhesion (Bonding Ratio)]

○ (good): bonding ratio of 50% or higher x (poor): bonding ratio of less than 50%
(Pickup Suppression Test)

The magnetic recording medium and a magnetic head were mounted on a spin stand, and the magnetic head was floated at a fixed point for 10 minutes under normal temperature and reduced pressure conditions (about 250 torr). Subsequently, the surface of the magnetic head facing the magnetic recording medium (the surface of the lubricating layer) was analyzed using an Electron Spectroscopy for Chemical Analysis (ESCA) analyzer. Based on the intensity of the fluorine-derived peak (signal intensity (a.u.)) measured by ESCA, the amount of the lubricant adhered to the magnetic head was evaluated against the criteria shown in Table 3.

TABLE 3

| Evaluation | Signal intensity | ESCA signal intensity |
|---|---|---|
| ◎ | 500 or less | Signal intensity is very low (amount of lubricant adhered to head is very small) |
| ○ | 501 to 1,000 | Signal intensity is low (amount of lubricant adhered to head is small) |
| X | 1,001 or greater | Signal intensity is high (amount of lubricant adhered to head is large) |

(◎: extremely good, ○: good, X: poor)

As shown in Table 2, in Examples 1 to 6, the evaluation result for the adhesion between the lubricant layer and the protective layer (the bonding ratio), and the evaluation result for the pickup suppression test were favorable in each case. Based on these results, it was evident that by forming a lubricant layer containing one of the compounds of Examples 1 to 6 on the protective layer of a magnetic recording medium, a lubricant layer having excellent adhesion to the protective layer and good resistance to pickup could be obtained, even when the thickness of the lubricant layer was reduced to 9 Å to 11 Å.

In contrast, as shown in Table 2, the bonding ratio values in Comparative Examples 1 to 6 were smaller than those observed in Examples 1 to 6. Further, in Comparative Examples 1 to 6, the evaluation results from the pickup suppression test were poor.

More specifically, in Comparative Examples 1, 2 and 4, it is thought that because $R^4$ was a hydroxyl group and the terminal groups had only one polar group, the adhesion to the protective layer was poor, meaning the evaluation result for the pickup suppression test was x.

In Comparative examples 2 to 5, it is thought that because $R^1$ and $R^3$ were the same, the evaluation result for the pickup suppression test was x.

In Comparative Example 6, it is thought that because $R^2$ and $R^3$ did not exist, the adhesion to the protective layer was poor, meaning the evaluation result for the pickup suppression test was x.

The present invention is not limited to the embodiments described above. The various structures and combinations and the like described in the above embodiments are merely examples, and additions, omissions, substitutions and other modifications can be made without departing from the spirit or scope of the present invention. Accordingly, the present invention is not to be considered as being limited by the above embodiments, and is only limited by the scope of the claims.

INDUSTRIAL APPLICABILITY

A fluorine-containing ether compound is provided that can be used favorably as a material for a lubricant for a magnetic recording medium that is capable of forming a lubricant layer that exhibits favorable adhesion to the protective layer, and can suppress pickup. By using a lubricant for a magnetic recording medium containing the fluorine-containing ether compound of the present invention, a lubricant layer can be obtained which, even when the thickness is reduced, exhibits excellent adhesion to the protective layer and can suppress pickup.

DESCRIPTION OF THE REFERENCE SIGNS

10: Magnetic recording medium
11: Substrate
12: Adhesive layer
13: Soft magnetic layer
14: First base layer
15: Second base layer
16: Magnetic layer
17: Protective layer
18: Lubricant layer

The invention claimed is:

1. A fluorine-containing ether compound represented by a formula (1) shown below:

$$R^4—CH_2—R^3—CH_2—R^2—CH_2—R^1—CH_2—R^2—CH_2—R^3—CH_2—R^4 \quad (1)$$

(wherein and $R^3$ represent different perfluoropolyether chains, $R^2$ is represented by a formula (6) shown below, and $R^4$ is a terminal group represented by one of formulas (2-2) to (2-5) shown below)

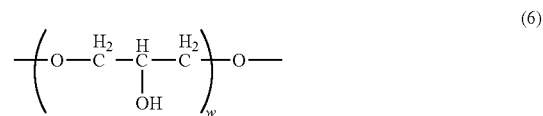

(wherein in formula (6), w represents an integer of 1),

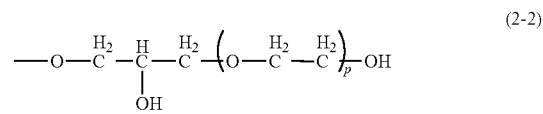

(wherein in formula (2-2), p represents an integer of 1 to 5),

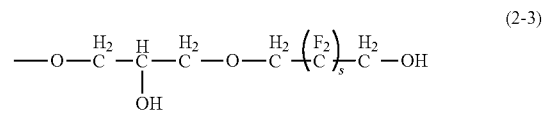

(wherein in formula (2-3), s represents an integer of 2 to 5),

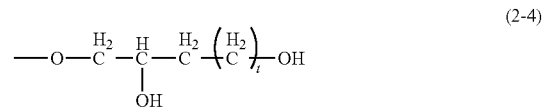

(wherein in formula (2-4), t represents an integer of 1 to 5),

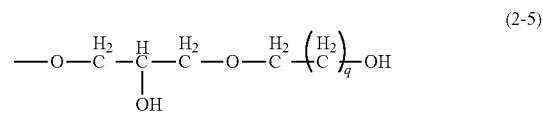

(wherein in formula (2-5), q represents an integer of 2 to 5).

2. The fluorine-containing ether compound according to claim 1, wherein R' in the formula (1) is a group represented by one of formulas (3-1), (3-2), (4) and (5) shown below:

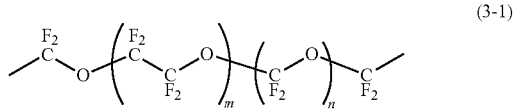

(wherein in formula (3-1), m represents an integer of 1 to 20, and n represents an integer of 1 to 10),

(wherein in formula (3-2), g represents an integer of 1 to 20),

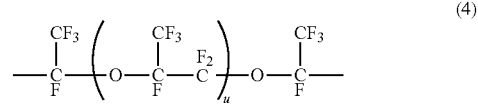

(wherein in formula (4), u represents an integer of 1 to 30),

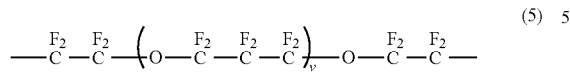 (5)

(wherein in formula (5), v represents an integer of 1 to 30).

3. The fluorine-containing ether compound according to claim 1, wherein the compound represented by the formula (1) is represented by a formula (E) shown below, and Rf in the formula (E) shown below is represented by a formula (RF) shown below:

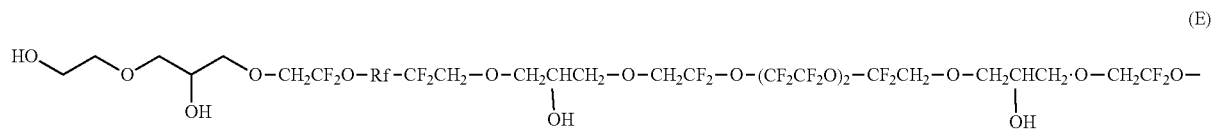 (E)

 (RF)

(wherein in formula (RF), x represents an integer of 1 to 7, and y represents an integer of 1 to 7).

4. The fluorine-containing ether compound according to claim 1, wherein the compound represented by the formula (1) is represented by a formula (F) shown below, and Rf in the formula (F) shown below is represented by a formula (RF) shown below:

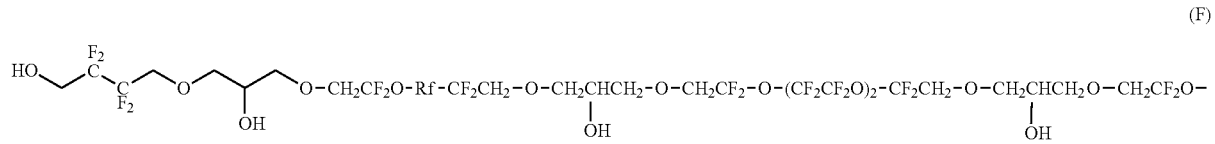 (F)

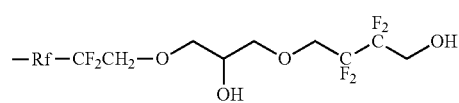

 (RF)

(wherein in formula (RF), x represents an integer of 1 to 7, and y represents an integer of 1 to 7).

5. The fluorine-containing ether compound according to claim 1, wherein the compound represented by the formula (1) is represented by a formula (H) shown below, and Rf in the formula (H) shown below is represented by a formula (RF) shown below:

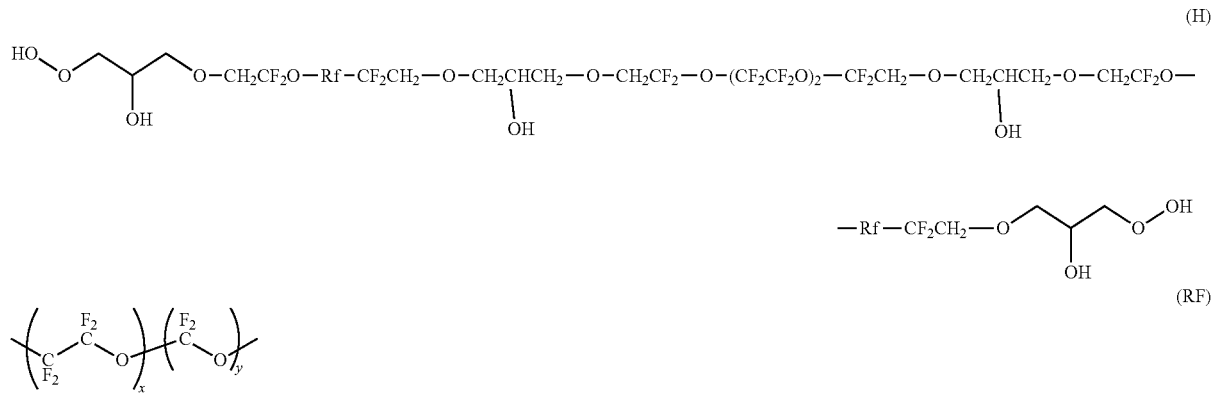

(H)

(RF)

(wherein in formula (RF), x represents an integer of 1 to 7, and y represents an integer of 1 to 7).

6. The fluorine-containing ether compound according to claim 1, wherein the compound represented by the formula (1) is represented by a formula (I) shown below, and Rf in the formula (I) shown below is represented by a formula (RF) shown below:

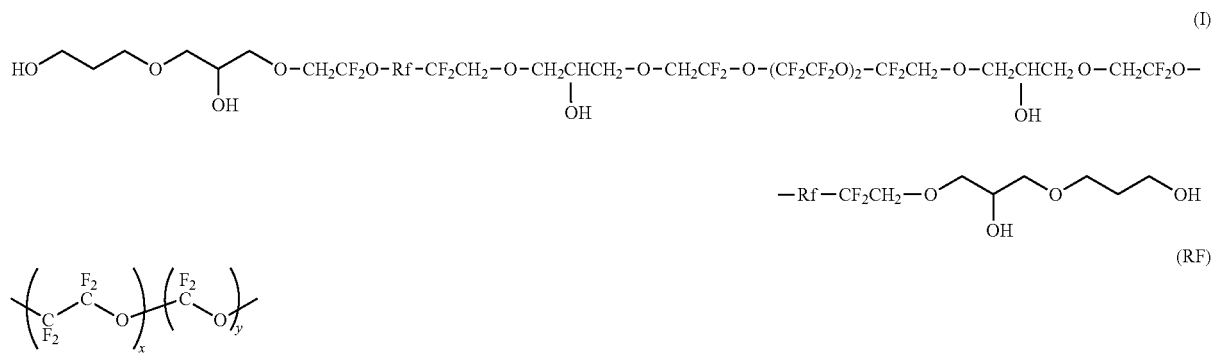

(I)

(RF)

(wherein in formula (RF), x represents an integer of 1 to 7, and y represents an integer of 1 to 7).

7. The fluorine-containing ether compound according to claim 1, wherein a number average molecular weight thereof is within a range from 1,000 to 10,000.

8. A lubricant for a magnetic recording medium comprising the fluorine-containing ether compound according to claim 1.

9. A magnetic recording medium comprising at least a magnetic layer, a protective layer and a lubricant layer provided sequentially on a substrate, wherein the lubricant layer comprises the fluorine-containing ether compound according to claim 1.

10. The magnetic recording medium according to claim 9, wherein an average thickness of the lubricant layer is from 0.5 nm to 3 nm.

11. A fluorine-containing ether compound represented by a formula (1) shown below:

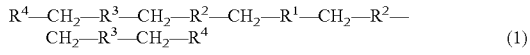

(wherein $R^1$ and $R^3$ represent different perfluoropolyether chains, $R^1$ is represented by a formula (RF-2) shown below or a formula (RF-3) shown below, $R^2$ represents a linking group containing one or more polar groups, and $R^4$ represents a terminal group containing two or more polar groups),

(RF-2)

(wherein in formula (RF-2), d represents an integer of 1 to 12),

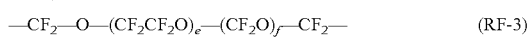

(RF-3)

(wherein in formula (RF-3), e represents an integer of 1 to 20, and f represents an integer of 1 to 10).

12. The fluorine-containing ether compound according to claim 11, wherein the compound represented by the formula (1) is represented by a formula (C) shown below, and Rf in the formula (C) shown below is represented by a formula (RF) shown below:

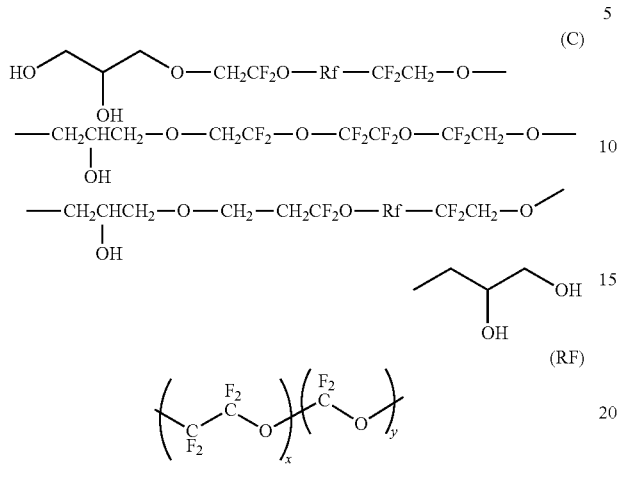

(wherein in formula (RF), x represents an integer of 1 to 7, and y represents an integer of 1 to 7).

13. The fluorine-containing ether compound according to claim 11, wherein the compound represented by the formula (1) is represented by a formula (K) shown below, and in the formula (K) shown below, Rf is represented by a formula (RF) shown below, and Rf₁ is represented by a formula (RF-1) shown below:

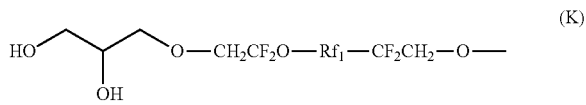

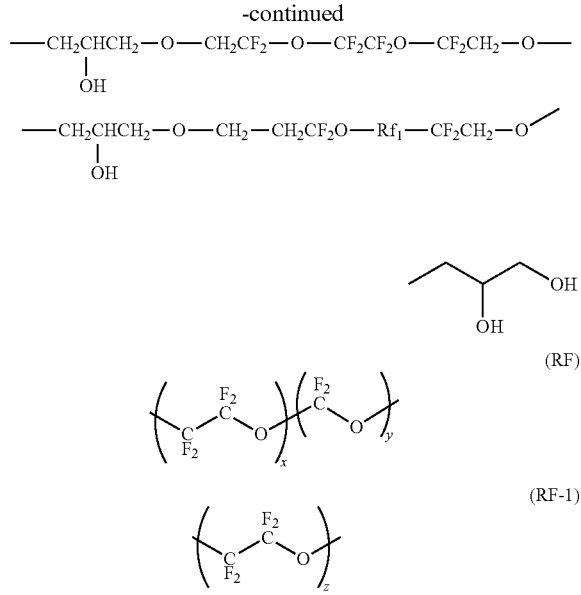

(wherein in formula (RF), x represents an integer of 1 to 7, and y represents an integer of 1 to 7, and in formula (RF-1), z represents an integer of 1 to 10).

14. A lubricant for a magnetic recording medium comprising the fluorine-containing ether compound according to claim 11.

15. A magnetic recording medium comprising at least a magnetic layer, a protective layer and a lubricant layer provided sequentially on a substrate, wherein the lubricant layer comprises the fluorine-containing ether compound according to claim 11.

* * * * *

UNITED STATES PATENT AND TRADEMARK OFFICE
CERTIFICATE OF CORRECTION

PATENT NO. : 11,332,686 B2
APPLICATION NO. : 16/470713
DATED : May 17, 2022
INVENTOR(S) : Naoya Fukumoto et al.

It is certified that error appears in the above-identified patent and that said Letters Patent is hereby corrected as shown below:

In the Claims

In Claim 1, at Column 45, Line 64:
Delete "wherein and $R^3$" and insert --wherein $R^1$ and $R^3$--.

Signed and Sealed this
Sixteenth Day of August, 2022

Katherine Kelly Vidal
*Director of the United States Patent and Trademark Office*